US012772024B2

(12) United States Patent
Volkerink et al.

(10) Patent No.: US 12,772,024 B2
(45) Date of Patent: Oct. 20, 2026

(54) TRANSIENT WIRELESS COMMUNICATIONS NETWORK

(71) Applicant: Trackonomy Systems, Inc., San Jose, CA (US)

(72) Inventors: Hendrik J Volkerink, Palo Alto, CA (US); Ajay Khoche, West San Jose, CA (US)

( * ) Notice: Subject to any disclaimer, the term of this patent is extended or adjusted under 35 U.S.C. 154(b) by 130 days.

(21) Appl. No.: 18/242,953

(22) Filed: Sep. 6, 2023

(65) Prior Publication Data

US 2024/0107280 A1 Mar. 28, 2024

Related U.S. Application Data

(62) Division of application No. 17/351,961, filed on Jun. 18, 2021, now Pat. No. 11,792,615.

(Continued)

(51) Int. Cl.
*H04W 4/38* (2018.01)
*G01S 19/39* (2010.01)
(Continued)

(52) U.S. Cl.
CPC ............... *H04W 4/38* (2018.02); *G01S 19/39* (2013.01); *G06Q 10/083* (2013.01); *G16Y 40/60* (2020.01);
(Continued)

(58) Field of Classification Search
None
See application file for complete search history.

(56) References Cited

U.S. PATENT DOCUMENTS 5,917,433 A 6/1999 Keillor et al.
6,121,864 A 9/2000 Tillmann
(Continued)

FOREIGN PATENT DOCUMENTS

AU 2018204317 A1 1/2019
AU 2018250358 A1 5/2019
(Continued)

OTHER PUBLICATIONS

Almalkawi et al., "Wireless Multimedia Sensor Networks: Current Trends and Future Directions," Sensors 2010, vol. 10, No. 7, pp. 6662-6717, doi: 10.3390/sl00706662.
(Continued)

*Primary Examiner* — Walter J Divito

(57) ABSTRACT

The disclosure generally relates in part to a transient wireless communications network that includes a first intelligent node having a processor, a memory communicatively coupled with the processor and storing a predetermined schedule of shipping data for at least one asset, and one or more network communications interfaces to communicate on the transient wireless communications network, the memory storing machine readable instructions that, when executed by the processor, cause the processor to identify, based on referencing the predetermined schedule, a second intelligent node of the transient wireless communication network that is available to communicate with the first intelligent node based on a time slot of the predetermined schedule defining communication between intelligent nodes within the network. The processor may further cause the network communication interface to transmit, during the time slot, data, from the first intelligent node to the second intelligent node.

20 Claims, 8 Drawing Sheets

Related U.S. Application Data

(60) Provisional application No. 63/040,727, filed on Jun. 18, 2020.

(51) Int. Cl.

| | |
|---|---|
| ***G06Q 10/083*** | (2024.01) |
| ***G16Y 40/60*** | (2020.01) |
| ***H04W 72/0446*** | (2023.01) |
| ***H04W 72/30*** | (2023.01) |

(52) U.S. Cl.
CPC ....... *H04W 72/0446* (2013.01); *H04W 72/30* (2023.01)

(56) References Cited

U.S. PATENT DOCUMENTS 6,265,977 B1 7/2001 Vega et al.
6,437,702 B1 8/2002 Ragland et al.
6,614,392 B2 9/2003 Howard
6,919,803 B2 7/2005 Breed
6,972,682 B2 12/2005 Wagner et al.
7,009,517 B2 3/2006 Wood
7,353,259 B1 4/2008 Bakke et al.
7,427,918 B2 9/2008 Fano
7,797,367 B1 9/2010 Gelvin et al.
8,095,070 B2 1/2012 Twitchell, Jr.
8,171,791 B2 5/2012 Sy et al.
8,258,953 B2 9/2012 Stern et al.
8,356,207 B2 1/2013 Hosek et al.
8,754,748 B2 6/2014 Orlassino
8,989,053 B1 3/2015 Skaaksrud et al.
9,015,071 B2 4/2015 Breed
9,015,652 B2 4/2015 Suenbuel et al.
9,182,231 B2 11/2015 Skaaksrud
9,189,226 B2 11/2015 Driesen et al.
9,565,622 B2 2/2017 Chikkappa et al.
9,633,327 B2 4/2017 Hamm et al.
9,740,976 B2 8/2017 Ozaki et al.
9,767,516 B1 9/2017 Konrardy et al.
9,773,220 B2 9/2017 Blanchard et al.
9,794,753 B1 10/2017 Stitt et al.
9,799,149 B2 10/2017 Davidson
9,824,329 B2 11/2017 Stirling et al.
9,854,556 B2 12/2017 Skaaksrud et al.
9,860,688 B2 1/2018 Kulkarni et al.
9,875,459 B2 1/2018 Altamirano et al.
9,984,350 B2 5/2018 Skaaksrud
10,057,722 B2 8/2018 Skaaksrud
10,078,955 B1 9/2018 Gang et al.
10,079,839 B1 9/2018 Bryan et al.
10,102,494 B2 10/2018 Skaaksrud
10,123,294 B2 11/2018 Thompson et al.
10,262,255 B2 4/2019 Khoche
10,313,925 B2 6/2019 Jones et al.
10,379,842 B2 8/2019 Malladi et al.
10,595,274 B2 3/2020 Khaled et al.
10,674,346 B2 6/2020 Faccin et al.
11,003,978 B2 5/2021 Khoche
11,115,732 B2 9/2021 Lucrecio et al.
11,363,427 B2 6/2022 Volkerink et al.
2003/0018927 A1 1/2003 Gadir et al.
2004/0039424 A1 2/2004 Merritt et al.
2004/0050429 A1 3/2004 Aylward et al.
2004/0193467 A1 9/2004 Williams et al.
2005/0046362 A1 3/2005 Ma et al.
2005/0063313 A1 3/2005 Nanavati et al.
2005/0131705 A1 6/2005 Gandhi et al.
2006/0071783 A1 4/2006 Culpepper et al.
2006/0158328 A1 7/2006 Culpepper et al.
2006/0250236 A1 11/2006 Ackley et al.
2007/0044539 A1 3/2007 Sabol et al.
2007/0046491 A1 3/2007 Fair et al.
2007/0049291 A1 3/2007 Kim et al.
2007/0077943 A1 4/2007 Hamilla
2007/0095905 A1 5/2007 Kadaba
2007/0285713 A1 12/2007 Yamamoto et al.
2008/0001712 A1 1/2008 Agarwal et al.
2008/0018492 A1 1/2008 Ehrke et al.
2008/0030345 A1 2/2008 Austin et al.
2008/0079567 A1 4/2008 Poor
2008/0151801 A1 6/2008 Mizuta
2008/0239282 A1 10/2008 Zou et al.
2008/0279103 A1 11/2008 Yong et al.
2009/0142579 A1 6/2009 Smith
2009/0147702 A1 6/2009 Buddhikot et al.
2009/0290511 A1 11/2009 Budampati et al.
2010/0029268 A1 2/2010 Myer et al.
2010/0039284 A1 2/2010 Hall et al.
2010/0045436 A1 2/2010 Rinkes
2010/0067420 A1 3/2010 Twitchell, Jr.
2010/0082870 A1 4/2010 Tokuhara
2010/0299401 A1 11/2010 Lloyd
2010/0315203 A1 12/2010 Peden et al.
2011/0035491 A1 2/2011 Gelvin et al.
2011/0068923 A1 3/2011 Burket et al.
2011/0139871 A1 6/2011 Yturralde et al.
2011/0192465 A1 8/2011 Collings
2011/0202554 A1 8/2011 Powilleit et al.
2011/0213435 A1 9/2011 Rom
2012/0147731 A1 6/2012 Choi et al.
2012/0293680 A1 11/2012 Guan
2012/0296999 A1* 11/2012 Kuo .................... H04L 12/2803 709/206
2013/0002044 A1 1/2013 Takehara et al.
2013/0070636 A1 3/2013 Farley et al.
2013/0089018 A1 4/2013 Kim et al.
2013/0107770 A1 5/2013 Marsden et al.
2013/0137422 A1 5/2013 Sugitani
2013/0205288 A1 8/2013 Sohm
2013/0272180 A1 10/2013 Kosuri et al.
2013/0278412 A1 10/2013 Kelly et al.
2014/0006131 A1 1/2014 Causey et al.
2014/0092083 A1 4/2014 Vanderah et al.
2014/0218195 A1 8/2014 Buckley
2014/0269429 A1* 9/2014 Chen ....................... H04W 4/38 370/254
2014/0269636 A1 9/2014 Jain
2015/0077254 A1 3/2015 Leyden et al.
2015/0154531 A1 6/2015 Skaaksrud
2015/0154538 A1 6/2015 Skaaksrud
2015/0154544 A1 6/2015 Skaaksrud
2015/0154554 A1 6/2015 Skaaksrud
2015/0156747 A1 6/2015 Skaaksrud et al.
2015/0170486 A1 6/2015 Penland
2015/0180971 A1 6/2015 Varney et al.
2015/0249482 A1 9/2015 Czaja
2015/0254950 A1 9/2015 Patterson et al.
2015/0319687 A1 11/2015 Farley et al.
2015/0349917 A1 12/2015 Skaaksrud
2016/0006837 A1* 1/2016 Reynolds ............ H04L 41/0816 709/203
2016/0033800 A1 2/2016 Liu
2016/0055454 A1 2/2016 Kazanchian
2016/0104099 A1 4/2016 Villamar
2016/0110085 A1 4/2016 Barton et al.
2016/0128043 A1 5/2016 Shuman et al.
2016/0188181 A1 6/2016 Smith
2016/0217399 A1 7/2016 Roelofs et al.
2016/0233927 A1 8/2016 Wu
2016/0234104 A1 8/2016 Hoffmann
2016/0239791 A1 8/2016 Burch et al.
2016/0269533 A1 9/2016 Taylor et al.
2016/0277884 A1 9/2016 Ehrman et al.
2016/0358444 A1 12/2016 Lundy
2017/0006135 A1 1/2017 Siebel et al.
2017/0006490 A1 1/2017 Shen et al.
2017/0012813 A1* 1/2017 Skaaksrud ............ H04W 24/08
2017/0012830 A1 1/2017 Skaaksrud et al.
2017/0026488 A1 1/2017 Hao et al.
2017/0039666 A1 2/2017 Kuersten et al.
2017/0155703 A1 6/2017 Hao et al.
2017/0169688 A1 6/2017 Britt et al.
2017/0238035 A1 8/2017 Perez
2017/0279892 A1 9/2017 Skaaksrud

(56) References Cited

U.S. PATENT DOCUMENTS

| | | | |
|---|---|---|---|
| 2017/0280297 | A1 | 9/2017 | Skaaksrud |
| 2017/0280351 | A1 | 9/2017 | Skaaksrud |
| 2018/0031256 | A1 | 2/2018 | Gillette et al. |
| 2018/0041856 | A1 | 2/2018 | Lou et al. |
| 2018/0046964 | A1 | 2/2018 | Leoni et al. |
| 2018/0052462 | A1 | 2/2018 | Arena |
| 2018/0084371 | A1 | 3/2018 | Scagnol et al. |
| 2018/0132183 | A1 | 5/2018 | Gattu |
| 2018/0137457 | A1 | 5/2018 | Sachs et al. |
| 2018/0139726 | A1 | 5/2018 | Choi et al. |
| 2018/0145927 | A1 * | 5/2018 | Srikanteswara .... H04L 41/5009 |
| 2018/0163095 | A1 | 6/2018 | Khoche |
| 2018/0165568 | A1 | 6/2018 | Khoche |
| 2018/0183874 | A1 | 6/2018 | Cook |
| 2018/0190096 | A1 | 7/2018 | Lundy |
| 2018/0262571 | A1 | 9/2018 | Akhtar |
| 2018/0276650 | A1 | 9/2018 | Hillier |
| 2018/0279179 | A1 | 9/2018 | Norlén et al. |
| 2018/0286372 | A1 | 10/2018 | Beckman et al. |
| 2018/0288013 | A1 | 10/2018 | Hennebert et al. |
| 2018/0293513 | A1 | 10/2018 | Sugaya |
| 2018/0302807 | A1 | 10/2018 | Chen et al. |
| 2018/0306609 | A1 | 10/2018 | Agarwal et al. |
| 2018/0321356 | A1 | 11/2018 | Kulkarni et al. |
| 2018/0357332 | A1 | 12/2018 | Fan |
| 2018/0365635 | A1 | 12/2018 | Lucrecio et al. |
| 2019/0025818 | A1 | 1/2019 | Mattingly et al. |
| 2019/0037362 | A1 | 1/2019 | Nogueira-Nine |
| 2019/0113632 | A1 | 4/2019 | Lucrecio et al. |
| 2019/0116091 | A1 | 4/2019 | Bijavara Aswathanarayana Rao et al. |
| 2019/0138534 | A1 | 5/2019 | Bernat et al. |
| 2019/0158606 | A1 | 5/2019 | Guim Bernat et al. |
| 2019/0174449 | A1 | 6/2019 | Shan et al. |
| 2019/0179298 | A1 | 6/2019 | Hosek et al. |
| 2019/0197354 | A1 | 6/2019 | Law et al. |
| 2019/0215729 | A1 | 7/2019 | Oyman et al. |
| 2019/0222055 | A1 | 7/2019 | Khoche et al. |
| 2019/0250653 | A1 | 8/2019 | Conlon |
| 2019/0254013 | A1 | 8/2019 | Chang et al. |
| 2019/0272458 | A1 | 9/2019 | Khoche |
| 2019/0281588 | A1 | 9/2019 | Zhang et al. |
| 2019/0285724 | A1 | 9/2019 | Meadow |
| 2019/0324439 | A1 | 10/2019 | Cella et al. |
| 2019/0325173 | A1 | 10/2019 | Tingler et al. |
| 2019/0362215 | A1 | 11/2019 | Khoche |
| 2019/0370624 | A1 | 12/2019 | Khoche |
| 2020/0012488 | A1 | 1/2020 | Koval et al. |
| 2020/0051015 | A1 | 2/2020 | Davis et al. |
| 2020/0072485 | A1 | 3/2020 | Lapalme |
| 2020/0098238 | A1 | 3/2020 | Skaaksrud |
| 2020/0100115 | A1 | 3/2020 | Skaaksrud |
| 2020/0151655 | A1 | 5/2020 | Khoche |
| 2020/0160622 | A1 | 5/2020 | Aquila et al. |
| 2020/0189507 | A1 | 6/2020 | Green |
| 2020/0225655 | A1 | 7/2020 | Cella et al. |
| 2020/0412565 | A1 | 12/2020 | Sanders et al. |
| 2021/0084457 | A1 | 3/2021 | Volkerink et al. |
| 2021/0117204 | A1 | 4/2021 | Eyole et al. |
| 2021/0209923 | A1 | 7/2021 | Kumura |
| 2021/0297826 | A1 | 9/2021 | Volkerink et al. |
| 2021/0405185 | A1 | 12/2021 | Price et al. |
| 2022/0100263 | A1 | 3/2022 | Nagar et al. |

FOREIGN PATENT DOCUMENTS

| | | | | |
|---|---|---|---|---|
| CA | 3061878 | A1 | 11/2018 | |
| CA | 3008512 | A1 | 12/2018 | |
| JP | 2008239282 | A | 10/2008 | |
| WO | 2013100834 | A1 | 7/2013 | |
| WO | 2017196190 | A1 | 11/2017 | |
| WO | WO-2018146327 | A1 * | 8/2018 | ............... H04L 5/14 |
| WO | 2019028269 | A2 | 2/2019 | |
| WO | 2019118440 | A1 | 6/2019 | |

OTHER PUBLICATIONS

Chong Shen et al., "A mobility framework to improve heterogeneous wireless network services," Inderscience Enterprises Ltd., 2011.

Cimino et al., Wireless communication, identification, and sensing technologies enabling integrated logistics: a study in the harbor environment, Research Gate, Oct. 2015, (https://www.researchgate.net/publication/283117890_Wireless_communication_identification_and_sensing_technologies_enabling_integrated_logistics_a_study_in_the_harbor_environment).

Ex Parte Quayle Action issued for U.S. Appl. No. 17/209,192, dated Nov. 19, 2021, 9 pages.

Extended European Search Report for European Application No. 19837758.2 mailed Feb. 25, 2022, 7 pages.

Extended European Search Report for European Application No. 19850357.5 mailed Mar. 4, 2022, 8 pages.

Extended European Search Report for European Application No. 19883019.2, dated Jul. 27, 2022, 12 pages.

Extended European Search Report for European Application No. 21774028.1 mailed Oct. 11, 2023, 13 pages.

Final Office Action issued in U.S. Appl. No. 16/680,469, mailed May 26, 2023, 14 pages.

Final Office Action issued in U.S. Appl. No. 16/680,469, mailed Nov. 22, 2023, 15 pages.

Hassan et al., "A Design of Packages Tracking System Based on Radio Frequency Identification" International Conference on Computer, Control, Electrical, and Electronics Engineering, IEEE 2018, 978-1-5386-4123.

International Preliminary Report on Patentability for PCT/US2019/046588, mailed Feb. 16, 2021, 7 pages.

International Search Report and Written Opinion for PCT/US2019/042488, mailed Nov. 5, 2019, 14 pages.

International Search Report and Written Opinion for PCT/US2019/046588 dated Jan. 6, 2020, 11 pages.

International Search Report and Written Opinion for PCT/US2020/023007 dated Jun. 15, 2020, 9 pages.

International Search Report and Written Opinion for PCT/US2020/050728 dated Dec. 16, 2020, 12 pages.

International Search Report and Written Opinion for PCT/US2021/023545, mailed Jun. 24, 2021, 14 pages.

International Search Report and Written Opinion for PCT/US2021/038140 dated Nov. 8, 2021, 11 pages.

International Search Report and Written Opinion for PCT/US2021/051383, mailed Dec. 28, 2021, 15 pages.

International Search Report and Written Opinion for PCT/US2021/053442, mailed Jan. 14, 2022, 17 pages.

Lucas Lacono, "Wireless Sensor Network Protocols," Universidad De Mendoza, Argentina, 2011.

Lucrecio et al., "Systems and Methods for Hybrid Cloud-Edge Computing Method for Automated Decision Making and Probabilistic Occurrence." U.S. Appl. No. 62/520,348, filed Jun. 15, 2017, expired.

Luo et al., "Self-Securing Ad Hoc Wireless Networks" Proceedings of the Seventh International Symposium on Computers and Communications (ISCC'02), 1530-1346/02, 2002, IEEE Computer Society.

M.A. Matin et al., "Overview of Wireless Sensor Network," Intech, 2012 (http://dx.doi.org/10.5772/49376.1).

Non Final Office Action for U.S. Appl. No. 16/680,469, mailed Apr. 28, 2022, 14 pages.

Non Final Office Action for U.S. Appl. No. 16/680,469, mailed Nov. 10, 2022, 12 pages.

Non Final Office Action for U.S. Appl. No. 16/822,932, mailed Jul. 30, 2021, 11 pages.

Non Final Office Action for U.S. Appl. No. 17/208,765, mailed Jul. 14, 2022, 9 pages.

Non Final Office Action for U.S. Appl. No. 17/448,346, mailed Dec. 5, 2024, 34 pages.

Non Final Office Action for U.S. Appl. No. 17/448,346, mailed Feb. 15, 2024, 30 pages.

(56) References Cited

OTHER PUBLICATIONS

Non Final Office Action for U.S. Appl. No. 17/493,823, mailed Jan. 3, 2024, 14 pages.
Non Final Office Action for U.S. Appl. No. 17/493,823, mailed Nov. 29, 2024, 14 pages.
Non Final Office Action for U.S. Appl. No. 17/569,464, mailed Aug. 16, 2024, 17 pages.
Non Final Office Action for U.S. Appl. No. 17/736,877, mailed Nov. 21, 2024, 16 pages.
Notice of Allowance for U.S. Appl. No. 16/680,469, mailed May 13, 2024, 8 pages.
Notice of Allowance for U.S. Appl. No. 17/019,694, mailed Jul. 30, 2021, 9 pages.
Notice of Allowance for U.S. Appl. No. 17/351,961, mailed Jun. 9, 2023, 9 pages.
Notice of Allowance for U.S. Appl. No. 17/493,823, mailed Apr. 30, 2025, 13 pages.
Pagani et al., “Resource Sharing Between Neighboring Nodes in Heterogeneous Wireless Sensor Networks.” 2015 European Conference on Networks and Communications (EuCNC). Conference dated Jun. 29 to Jul. 2, 2015.
Viswanadham et al., “Lead Time Models For Analysis of Supply Chain Networks”, pp. 1-10 (2007).
Written Opinion for Singapore Patent Application No. 11202101512T, mailed Oct. 21, 2022, 7 pages.

* cited by examiner

129

| WIRELESS AGENT ATTRIBUTES TABLE | | |
|---|---|---|
| MASTER AGENT | SECONDARY AGENT | TERTIARY AGENT |
| Child Node | Intermediate Parent Node | Parent Node |
| Low Power Communications Interface (White) | Low and Medium Power Communications Interfaces (Green) | Low, Medium, High Power Communications Interfaces (Black) |
| Bluetooth LE | Bluetooth LE<br>LoRa | Bluetooth LE<br>LoRa<br>Cellular<br>NFC<br>RFID |

FIG. 5

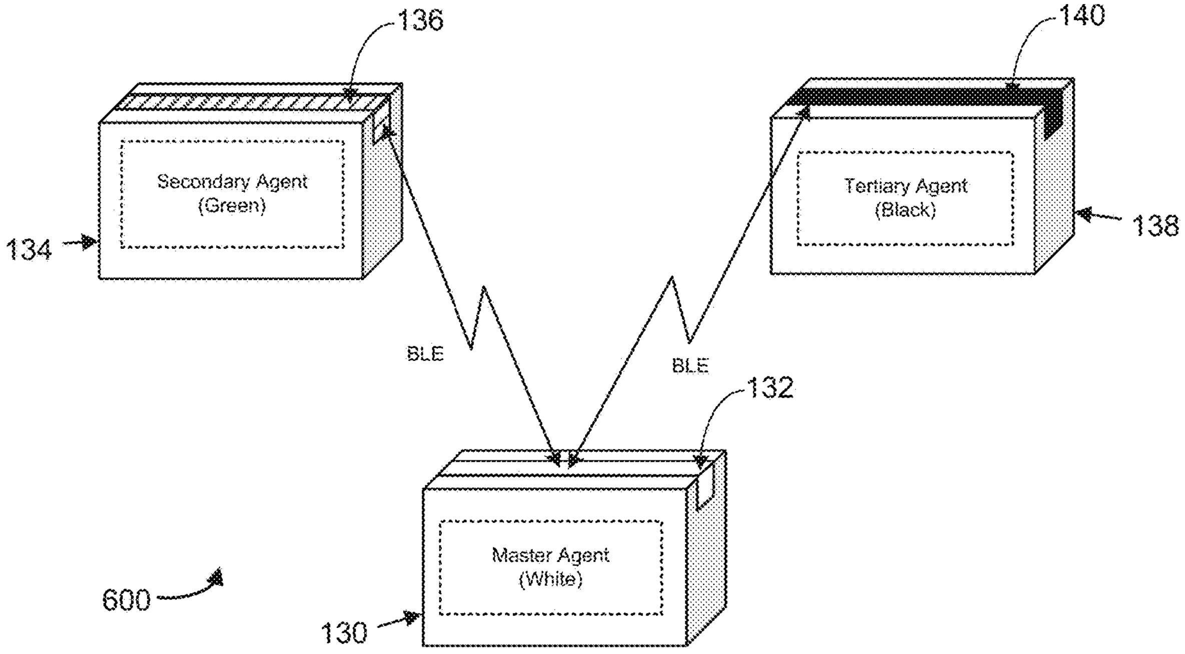

FIG. 6

TRANSIENT WIRELESS COMMUNICATIONS NETWORK

RELATED APPLICATIONS

This application is a continuation of pending U.S. patent application Ser. No. 17/351,961, filed on Jun. 18, 2021, which claims priority to U.S. Patent Application Ser. No. 63/040,727, titled "TRANSIENT WIRELESS COMMUNICATIONS NETWORK", filed Jun. 18, 2020, all of which are incorporated herein by reference, in their entirety.

FIELD OF THE DISCLOSURE

The disclosure generally relates in part to transient wireless communications networks for industrial internet-of-things (IoT) and more particularly to asset management, including packaging, tracking, warehousing, inventorying, and monitoring items, objects, parcels, persons, tools, and other things, as well as resource sharing.

BACKGROUND

Wireless node networks traditionally are implemented as centralized or tree-based network topologies in which a small set of nodes are directly linked to each other hierarchically. Star and tree topologies are non-linear data structures that organize objects hierarchically. These topologies consist of a collection of nodes that are connected by edges, where each node contains a value or data, and each node may or may not have a child node. Oftentimes, the nodes of a wireless sensor network are organized hierarchically according to the roles and attributes of the nodes (e.g., communications range, battery life, processor clock rate, etc.). For example, the nodes of a wireless-sensor network may be organized as a hierarchical tree structure with one or more short range, low-power child nodes populating the bottom level of the tree structure, and a high-power master node at a higher level of the tree structure to manage the child nodes.

SUMMARY OF THE INVENTION

According to embodiments of the present disclosure, a transient wireless communications network may include a first intelligent node having a processor, a memory communicatively coupled with the processor and storing a predetermined schedule of shipping data for at least one asset, and one or more network communications interfaces to communicate on the transient wireless communications network, the memory storing machine readable instructions that, when executed by the processor, cause the processor to identify, based on referencing the predetermined schedule, a second intelligent node of the transient wireless communication network that is available to communicate with the first intelligent node based on a time slot of the predetermined schedule defining communication between intelligent nodes within the network. The processor may further cause the network communication interface to transmit, during the time slot, data, from the first intelligent node to the second intelligent node.

According to embodiments of the present disclosure, a method may include a first intelligent node broadcasting a request for a resource of a particular type that is required to complete a task. The method may further include the first intelligent node receiving, from a second intelligent node, a reply that the second intelligent node can provide the requested resource. The method may further include the first intelligent node selecting the second intelligent node to perform the task using the resource of the particular type. The method may further include the first intelligent node receiving, from the second intelligent node, a confirmation to perform the task using the resource of the particular type.

According to embodiments of the present disclosure, a network of intelligent nodes may include a master node that includes a low-power wireless-communication interface configured to communicate with intelligent nodes within a proximity of the low-power wireless-communication interface of the master node. The network of intelligent nodes may include a secondary node configured to execute instructions received from the master node that includes a low-power wireless-communication interface and a medium-power wireless-communication interface. The medium-power wireless-communication interface has a longer range of communication than the low-power wireless-communication interface. The network of intelligent nodes may further include a tertiary node configured to execute instructions received from the master node that includes a low-power wireless-communication interface, a medium-power wireless-communication interface, and a high-power wireless-communication interface. The high-power wireless-communication interface has a longer range of communication than the low-power wireless-communication and medium-power wireless-communication interfaces and is configured to wirelessly communicate with a server associated with the network.

BRIEF DESCRIPTION OF DRAWINGS

FIG. 5 is a table of attributes of three different types of tape agents: a master agent, a secondary agent, and a tertiary agent, according to an embodiment.

FIG. 6 a diagrammatic view of a master agent communicating with a secondary agent and a tertiary agent, according to an embodiment.

DETAILED DESCRIPTION

Figure 1:
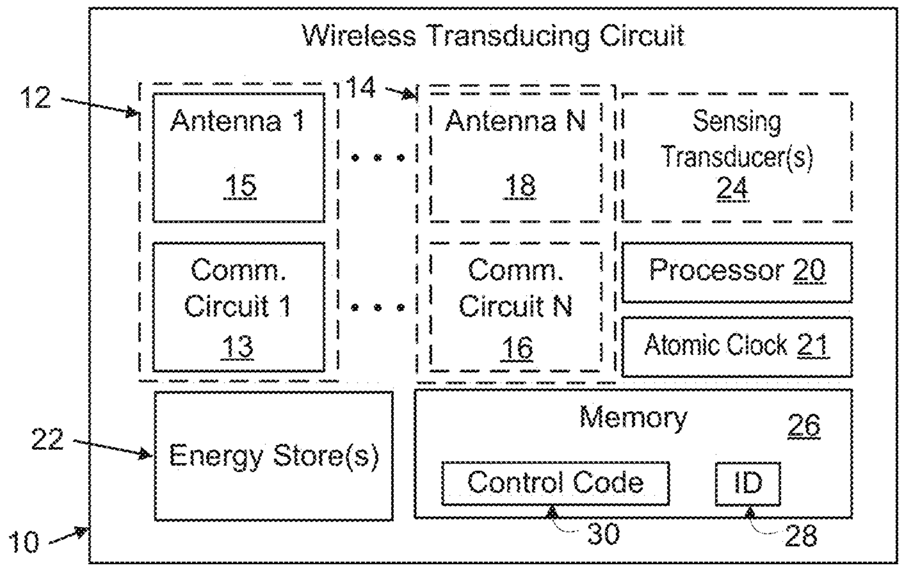
FIG. 1 is a schematic view of an example wireless transducing circuit, according to an embodiment.

The present disclosure is not limited in any way to the illustrated embodiments. Instead, the illustrated embodiments described below are merely examples of the disclosure. Therefore, the structural and functional details disclosed herein are not to be construed as limiting the claims. The disclosure merely provides bases for the claims and representative examples that enable one skilled in the art to make and use the claimed disclosures. Furthermore, the terms and phrases used herein are intended to provide a comprehensible description of the disclosure without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," and "unit" refer to hardware, software, or firmware, or a combination thereof.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent", an agent with a medium-power wireless communication-interface may be referred to a "secondary agent", and an agent with a high-power wireless communication-interface may be referred to a "tertiary agent". In some examples, a secondary agent may also include a low-power wireless-communication interface and a tertiary agent may also include low and medium-power wireless-communication interfaces, as discussed below with reference to FIG. 3A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "tape nodes" or "tape agents" may be referred to as "intelligent nodes", "intelligent tape nodes", or "intelligent tape agents" or any variant thereof, depending on the context and, for ease, may be used interchangeably. Intelligent nodes are not limited to a tape agent or tape node platform. In some embodiments, intelligent nodes may be the nodes or agents, such as the master agent, secondary agent, or tertiary agent, as described herein. In some embodiments, the intelligent nodes may be a client device (e.g., a smart device, such as mobile gateway 410, that includes the client application 422 in FIG. 10) or a gateway device (e.g., stationary gateway 414 or mobile gateway 412 in FIG. 10).

In certain contexts, the terms "parcel," "envelope," "box," "package," "container," "pallet," "carton," "wrapping," and the like are used interchangeably herein to refer to a packaged item or items.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Applications may represent one or more of event detection applications, monitoring applications, security applications, notification applications, and tracking applications, including inventory tracking, package tracking, person tracking, animal (e.g., pet) tracking, manufactured parts tracking, and vehicle tracking. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

FIG. 1 shows a block diagram of the components of an example wireless transducing circuit 10 (e.g., a tape node) that includes one or more wireless communication modules 12, 14. Each communication module 12, 14 includes a wireless communication circuit 13, 16, and an antenna 15, 18, respectively. Each communication circuit 13, 16 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 10 also includes a processor 20 (e.g., a microcontroller or microprocessor), a solid-state atomic clock 21, at least one energy store 22 (e.g., non-rechargeable or rechargeable printed flexible battery, conventional single or multiple cell battery, and/or a super capacitor or charge pump), one or more sensing transducers 24 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 10.

Sensing transducers 24 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 10 includes a memory 26 for storing data, such as profile data, state data, event data, sensor data, localization data, security data, and/or at least one unique identifier (ID) 28 associated with the wireless transducing circuit 10, such as one or more of a product ID, a type ID, and a media access control (MAC) ID. Memory 26 may also store control code 30 that includes machine-readable instructions that, when executed by the processor 20, cause processor 20 to perform one or more autonomous agent tasks. In certain embodiments, the memory 26 is incorporated into one or more of the processor 20 or sensing transducers 24. In other embodiments, memory 26 is integrated in the wireless transducing circuit 10 as shown in FIG. 1. The control code 30 may implement programmatic functions or program modules that control operation of the wireless transducing circuit 10, including implementation of an agent communication manager that manages the manner and timing of tape agent communications, a node power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 10. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 2:
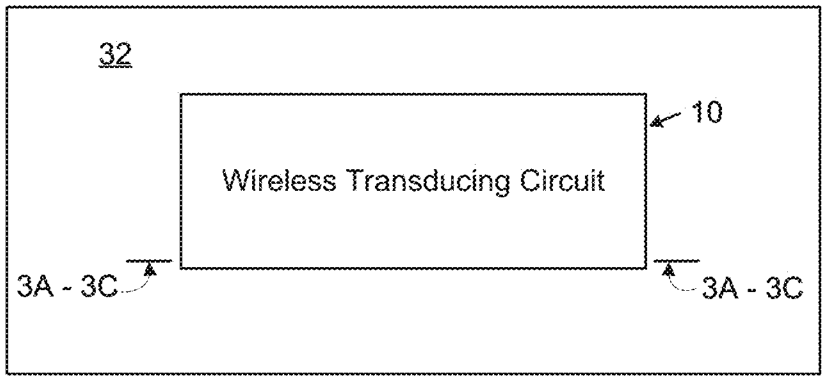
FIG. 2 is a diagrammatic top view of a platform containing an embedded wireless transducing circuit, according to an embodiment.

FIG. 2 is a top view of a generic platform 32 for the wireless transducing circuit 10. In some embodiments, multiple platforms 32 may each contain respective sets of components that are identical and configured in the same way. In other embodiments, multiple platforms 32 may each contain respective sets of components that differ and/or are configured in different ways. For example, different ones of the platforms 32 have different sets or configurations of tracking and/or transducing components that are designed and/or optimized for different applications. Also, or alternatively, different sets of segments of the platform 32 may have different ornamentations (e.g., markings on the exterior surface of the platform) and/or different dimensions.

An example method of fabricating the platform 32 (with reference to FIG. 2) uses to a roll-to-roll fabrication process as described in connection with FIGS. 6, 7A, and 7B of U.S. patent application Ser. No. 15/842,861, filed Dec. 14, 2017, the entirety of which is incorporated herein by reference.

Figure 3A:
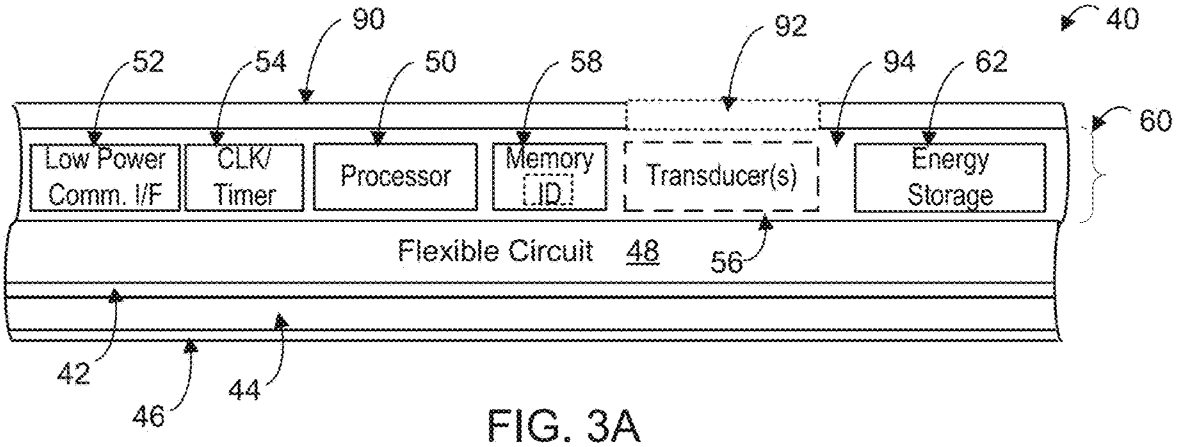
FIGS. 3A-3C show diagrammatic cross-sectional side views of portions of different respective agents, according to various embodiments.

FIG. 3A shows a cross-sectional side view of a portion of an example segment 40 of a flexible adhesive tape agent platform (e.g., platform 32 of FIG. 2) that includes a respective set of the components of the wireless transducing circuit 10 corresponding to the first tape-agent type (e.g., white). The segment 40 includes an adhesive layer 42, an optional flexible substrate 44, and an optional adhesive layer 46 on the bottom surface of the flexible substrate 44. When the bottom adhesive layer 46 is present, a release liner (not shown) may be (weakly) adhered to the bottom surface of the adhesive layer 46. In certain embodiments where adhesive layer 46 is included, the adhesive layer 46 is an adhesive (e.g., an acrylic foam adhesive) with a high-bond strength that is sufficient to prevent removal of the segment 40 from a surface on which the adhesive layer 46 is adhered to without destroying the physical or mechanical integrity of the segment 40 and/or one or more of its constituent components. In certain embodiments including the optional flexible substrate 44, the optional flexible substrate 44 is a prefabricated adhesive tape that includes the adhesive layers 42 and 46 and the optional release liner. In other embodiments including the optional flexible substrate 44, the adhesive layers 42, 46 are applied to the top and bottom surfaces of the flexible substrate 44 during the fabrication of the adhesive tape platform. The adhesive layer 42 may bond the flexible substrate 44 to a bottom surface of a flexible circuit 48, that includes one or more wiring layers (not shown) that connect the processor 50, a low-power wireless-communication interface 52 (e.g., a Zigbee, Bluetooth® Low Energy (BLE) interface, or other low power communication interface), a clock and/or a timer circuit 54, transducing and/or transducer(s) 56 (if present), the memory 58, and other components in a device layer 60 to each other and to the energy storage device 62 and, thereby, enable the transducing, tracking and other functionalities of the segment 40. The low-power wireless-communication interface 52 typically includes one or more of the antennas 15, 18 and one or more of the wireless communication circuits 13, 16. The segment 40 may further include a flexible cover 90, an interfacial region 92, and a flexible polymer layer 94.

Figure 3B:
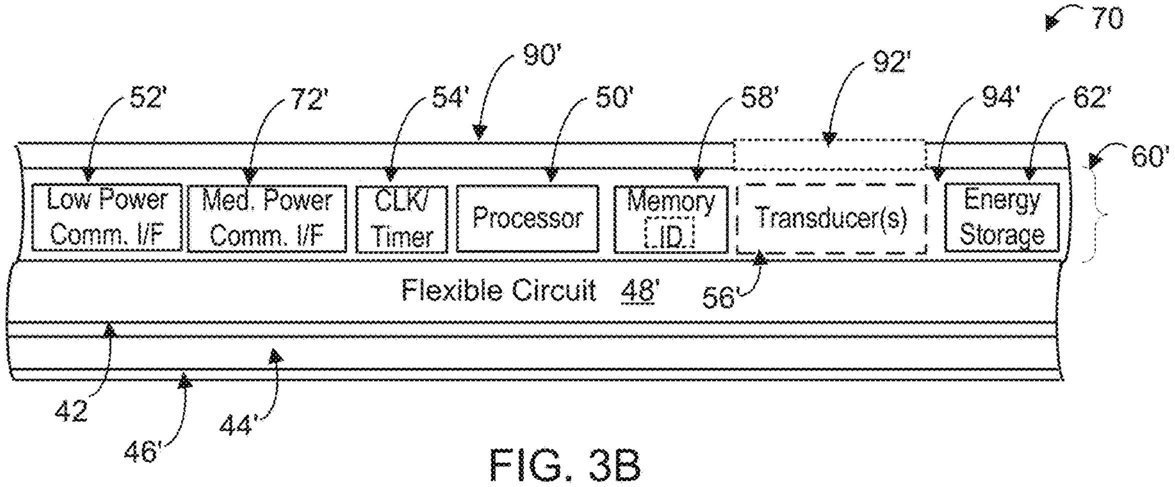

FIG. 3B shows a cross-sectional side-view of a portion of an example segment 70 of a flexible adhesive tape agent platform (e.g., platform 32 of FIG. 2) that includes a respective set of the components of the wireless transducing circuit 10 corresponding to a second tape-agent type (e.g., green). The segment 70 is similar to the segment 40 shown in FIG. 3A but further includes a medium-power communication-interface 72' (e.g., a LoRa interface) in addition to the low-power communications-interface 52. The medium-power communication-interface 72' has a longer communication range than the low-power communication-interface 52'. In certain embodiments, one or more other components of the segment 70 differ from the segment 40 in functionality or capacity (e.g., larger energy source). The segment 70 may include further components, as discussed above and below with reference to FIGS. 3A, and 3C.

Figure 3C:
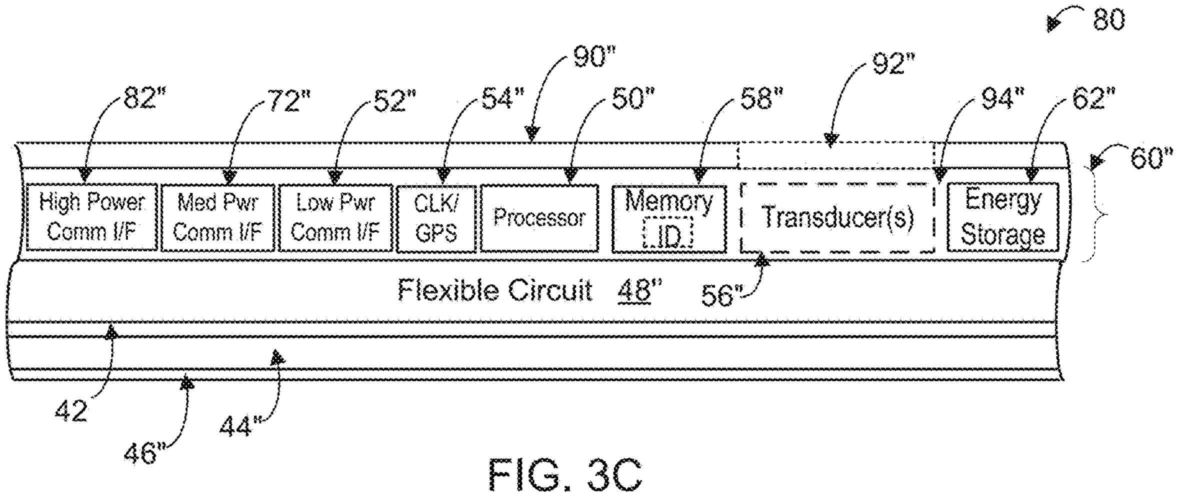

FIG. 3C shows a cross-sectional side view of a portion of an example segment 80 of the flexible adhesive tape-agent platform that includes a respective set of the components of the wireless transducing circuit 10 corresponding to the third tape-node type (e.g., black). The segment 80 is similar to the segment 70 of FIG. 3B, but further includes a high-power communications-interface 82" (e.g., a cellular interface; e.g., GSM/GPRS) in addition to a low-power communications-interface 52", and may include a medium-power communications-interface 72". The high-power communications-interface 82" has a range that provides global coverage to available infrastructure (e.g. the cellular network). In certain embodiments, one or more other components of the segment 80 differ from the segment 70 in functionality or capacity (e.g., larger energy source). The segment includes further components, as discussed above with reference to FIGS. 3A, and 3B.

FIGS. 3A-3C show embodiments in which the flexible covers 90, 90', 90" of the respective segments 40, 70, and 80 include one or more interfacial regions 92, 92', 92" positioned over one or more of the transducers 56, 56', 56". In certain embodiments, one or more of the interfacial regions 92, 92', 92" have features, properties, compositions, dimensions, and/or characteristics that are designed to improve the operating performance of the platform for specific applications. In certain embodiments, the flexible adhesive tape platform includes multiple interfacial regions 92, 92', 92" over respective transducers 56, 56', 56", which may be the same or different depending on the target applications. Interfacial regions may represent one or more of an opening, an optically transparent window, and/or a membrane located in the interfacial regions 92, 92', 92" of the flexible covers 90, 90', 90" that is positioned over the one or more transducers and/or transducers 56, 56', 56". Additional details regarding the structure and operation of example interfacial regions 92, 92', 92" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 94, 94', 94" encapsulates the respective device layers 60, 60', 60" and thereby reduces the risk of damage that may result from the intrusion of contaminants and/or liquids (e.g., water) into the device layer 60, 60', 60". The flexible polymer layers 94, 94', 94" may also planarize the device layers 60, 60', 60". This facilitates optional stacking of additional layers on the device layers 60, 60', 60" and also distributes forces generated in, on, or across the segments 40, 70, 80 so as to reduce potentially damaging asymmetric stresses that might be caused by the application of bending, torqueing, pressing, or other forces that may be applied to the segments 40, 70, 80 during use. In the illustrated example, a flexible cover 90, 90', 90" is bonded to the planarizing polymer 94, 94', 94" by an adhesive layer (not shown).

The flexible cover 90, 90', 90" and the flexible substrate 44, 44', 44" may have the same or different compositions depending on the intended application. In some examples, one or both of the flexible cover 90, 90', 90" and the flexible substrate 44, 44', 44" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 90, 90', 90" and the adhesive layers 42, 42', 42", 46, 46', 46" on the top and bottom surfaces of the flexible substrate 44, 44', 44" typically include a pressure-sensitive adhesive (e.g., a silicon-based adhesive). In some examples, the adhesive layers are applied to the flexible cover 90, 90', 90" and the flexible substrate 44, 44', 44" during manufacture of the adhesive tape-agent platform (e.g., during a roll-to-roll or sheet-to-sheet fabrication process). In other examples, the flexible cover 90, 90', 90" may be implemented by a prefabricated single-sided pressure-sensitive adhesive tape and the flexible substrate 44, 44', 44" may be implemented by a prefabricated double-sided pressure-sensitive adhesive tape; both kinds of tape may be readily incorporated into a roll-to-roll or sheet-to-sheet fabrication process. In some examples, the flexible substrate 44, 44', 44" is composed of a flexible epoxy (e.g., silicone).

In certain embodiments, the energy storage device 62, 62', 62" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 52, 52', 52" and/or the processor(s) 50, 50', 50" may be integrated on the flexible battery substrate. In some examples, one or more of such components also (e.g., the flexible antennas and the flexible interconnect circuits) may be printed on the flexible battery substrate.

In examples of manufacture, the flexible circuit 48, 48', 48" is formed on a flexible substrate by one or more of printing, etching, or laminating circuit patterns on the flexible substrate. In certain embodiments, the flexible circuit 48, 48', 48" is implemented by one or more of a single-sided flex circuit, a double access or back-bared flex circuit, a sculpted flex circuit, a double-sided flex circuit, a multilayer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 40, 70, 80 shown in FIGS. 3A-3C, the flexible circuit 48, 48', 48" represents a single-access flex-circuit that interconnects the components of the adhesive tape platform on a single side of the flexible circuit 48, 48', 48". However, in other embodiments, the flexible circuit 48, 48', 48" represents a double access flex circuit that includes a front-side conductive pattern that interconnects the low-power communications interface 52, 52', 52", the timer circuit 54, 54', 54", the processor 50, 50', 50", the one or more sensor transducers 56, 56', 56" (if present), and the memory 58, 58', 58", and allows through-hole access (not shown) to a back-side conductive pattern that is connected to the flexible battery (not shown). In these embodiments, the front-side conductive pattern of the flexible circuit 48, 48', 48" connects the communications circuits 52, 52', 52", 72', 72", 82" (e.g., receivers, transmitters, and transceivers) to their respective antennas and to the processor 50, 50', 50" and also connects the processor 50, 50', 50" to the one or more sensors and the memory 58, 58', and 58". The backside conductive pattern connects the active electronics (e.g., the processor 50, 50', 50", the communications circuits 52, 52', 52", 72', 72", 82" and the transducers) on the front-side of the flexible circuit 48, 48', 48" to the electrodes of the energy storage device 62, 62', 62" via one or more through holes in the substrate of the flexible circuit 48, 48', 48".

Figure 4A:
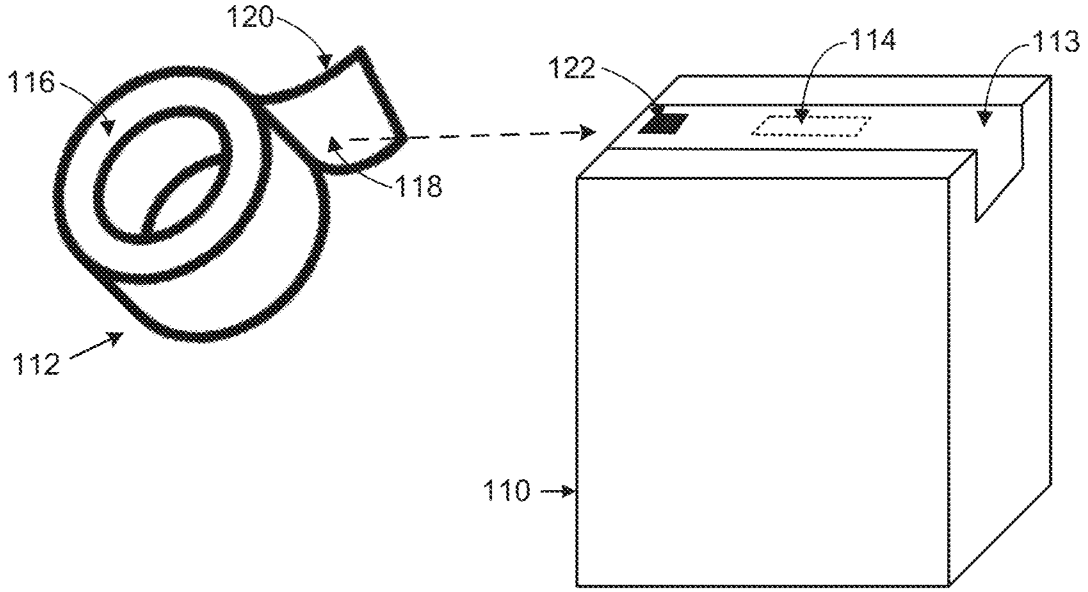
FIG. 4A is a diagrammatic view of a package that has been sealed for shipment using an agent dispensed from a roll, according to an embodiment.

FIG. 4A shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 4B:
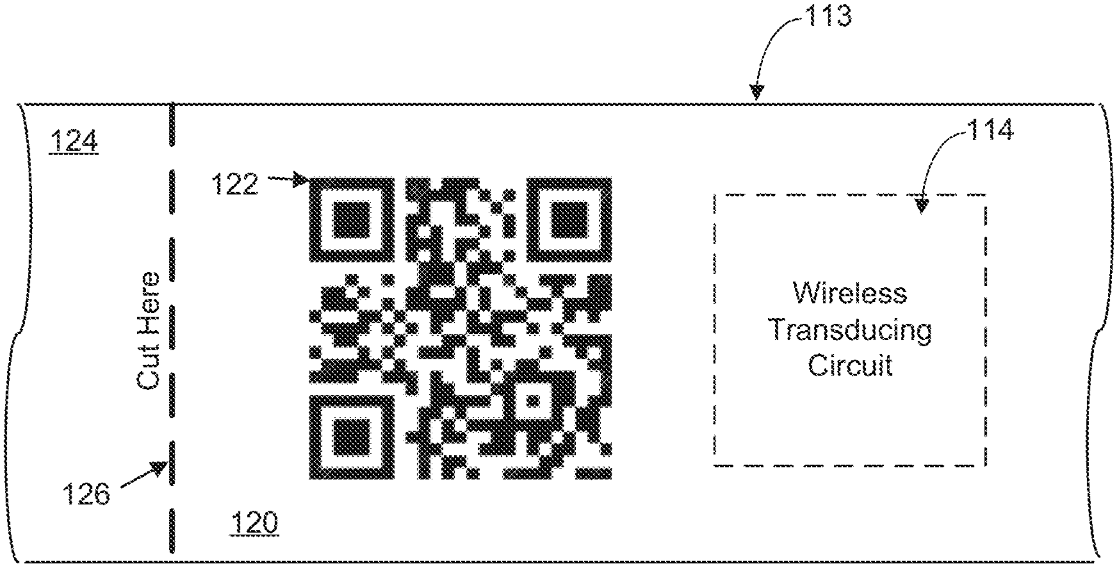
FIG. 4B is a diagrammatic top view of a portion of the agent including an embedded wireless transducing circuit shown in FIG. 1A, according to an embodiment.

FIG. 4B shows the non-adhesive surface 120 of the segment 113 of the adhesive tape agent platform 112 of FIG. 4A including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example in FIG. 4B, the segment 113 of the adhesive tape agent platform 112 includes an identifier 122 (e.g., a two-dimensional bar code, such as a QR Code), written instructions 124 (e.g., "Cut Here"), and an associated cut line 126 that indicates where the user should cut the adhesive tape agent platform 112. The written instructions 124 and the cut line 126 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 126 may demarcate the boundaries between adjacent segments at locations that are free of any active components of the wireless transducing circuit 114. The spacing between the wireless transducing circuit 114 and the cut lines 126 may vary depending on the intended communication, transducing and/or adhesive taping application. In the example illustrated in FIG. 4A, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 126. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 126).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Network Architecture

This specification describes an example network of wireless communications devices that may be used to implement an ultra low-cost wireless network infrastructure for performing monitoring, tracking, and other industrial IoT functions relating to, for example, parcels, persons, tools, equipment and other physical assets and objects. In one example, the network includes the set of three different types of wireless transducing circuits (e.g., the wireless transducing circuit 10, FIG. 1) embedded in a flexible adhesive tape form factor (e.g., platform 32 FIG. 2, and platform 116, FIG. 4A) and that have different respective functionalities and optionally different respective cover markings that visually distinguish the different wireless communications device types from one another. In one non-limiting example, the covers of the different wireless communications interface types are marked with different colors (e.g., white, green, and black). In the illustrated examples, the different wireless communications interface types are distinguishable from one another by their respective wireless communications capabilities and their respective sensing capabilities. In other examples, the wireless transducing circuits may be incorporated into different form factors, such as a set of devices that are pluggable into an alternating current (AC) electrical power mains outlet or a direct current (DC) electrical power outlet.

The instant specification describes an example network of agents (also referred to herein as "tape agents" or "tape nodes" interchangeably) that may be used to implement a low-cost wireless network infrastructure for performing monitoring, tracking, and shipping (e.g., all of which may utilize IoT devices) relating to, for example, parcels, persons, tools, equipment and other physical assets and objects. The example network includes a set of three different types of agents that have different respective functionalities and different respective cover markings that visually distinguish the different agent types from one another. Other systems may include fewer than three or more than three different types of agents. In one non-limiting example, the covers of the different agent types are marked with different colors (e.g., white, green, and black). Further, the different agent types also are distinguishable from one another by their respective wireless communications capabilities and their respective sensing capabilities.

FIG. 5 is a table 129 showing attributes of three different types of tape agents: a master agent, a secondary agent, and a tertiary agent. This table 129 may be preprogrammed into the memory (e.g., 58, 58', 58", FIG. 3A-C) of each agent, where the processors (e.g., 50, 50', 50", FIG. 3A-C) of each agent (e.g., the master agent 132, 136, 140, FIG. 6, discussed below) may execute instructions according to the role of each agent. The left column of table 129 lists the attributes of the master agent. Among the attributes of the master agent are a master agent role (e.g., the agent may have a role that includes directing other agents to perform predetermined functions, such as instructing other master agents, or secondary or tertiary agents, to perform the predetermined functions); a child agent (e.g., the child agent may have a role that includes being directed by a parent agent to perform predetermined functions according to the parent-agent's instructions) placement in physical premises (a peripheral or leaf node placement); and a low-power wireless-communications interface (e.g., a Bluetooth LE communications interface or a Zigbee communications interface). The master agent role attribute enables the master agent to exercise unilateral control over other non-master types of agents, such as a secondary agent and a tertiary agent. However, when the secondary or tertiary agent is a parent and the master agent is a child, the parent may instruct the child to perform tasks. The child node attribute configuration corresponds to a peripheral end node or leaf node that interacts in a particular environment (e.g., physical premises, such as a building, warehouse, loading dock, etc.). In the illustrated embodiment, the master-child node has a low power communications interface (e.g., Bluetooth LE) for communicating with other nodes over short distance wireless communications links.

The center column of table 129 lists the attributes of the secondary agent. Among the attributes of the secondary agent are a secondary agent role (e.g., the secondary agent may include a medium-power wireless-communication interface, such as indicated with reference to FIG. 3B, that may communicate with a stationary or mobile gateway, with reference to the stationary gateway 414 or mobile gateway 412 in FIG. 10); an intermediate parent-node placement in a physical premises within communication range of one or more child nodes (e.g., a master agent child node) and optionally within communication range of one or more of the tertiary agent parent nodes; and low and intermediate-power wireless-communications interfaces (e.g., Bluetooth LE and LoRa communications interfaces). The intermediate parent-node attribute configuration corresponds to an intermediate node that communicates with the child nodes in the physical premises and communicates with the tertiary agent. In the illustrated embodiment, the secondary agent may also have a low power communications interface (e.g., Bluetooth LE communications interface) for communicating with the child nodes and a medium-power communications interface (e.g., LoRa communications interface) for communicating with a parent node (e.g., a tertiary agent, as indicated in FIG. 5) or server node (e.g., the stationary gateway 414, with reference to FIG. 10) over longer-distance wireless-communication links. In the illustrated embodiment, the communications interfaces of the secondary tape agent are backward compatible with the child nodes.

The right column of table 129 lists the attributes of the tertiary agent. Among the attributes of the tertiary agent are a tertiary agent role; a placement in relation to the physical premises that is within range of the of the secondary agent and optionally within communication range of one or more of the master agents; and low, intermediate, and high-power communications interfaces (e.g., with reference to FIG. 3C, that may include Bluetooth LE, LoRa, Cellular, NFC, and RFID communications interfaces) for communicating with the master and secondary agents. In the illustrated embodiment, the communications interfaces of the tertiary agent are backward compatible with the master and secondary agents.

FIG. 6 shows a network 600 including three agents, a master agent 132, a secondary agent 136, and a tertiary agent 140, attached to three packages 130, 134, and 138 (also referred to herein as parcels, boxes, containers, etc.), respectively, where each of the packages 130, 134, and 138 are associated with a respective tape agents 132, 136, 140. FIG. 6 is not meant to be limited to agents attached to packages but may rather be agents attached to infrastructure (e.g., walls, pillars, buildings, etc.) or vehicles (e.g., automobiles, planes, ships, trains, drones, etc.) or any other object the agent is capable of being attached to. For example, the master agent 132 may be attached to a package (e.g., the first package 130) and the secondary and tertiary agents 136, 140 are attached to infrastructure, such as a wall or a building.

Continuing with the embodiment in FIG. 6, the master-agent 132 child-node (as discussed in table 129, with reference to FIG. 5) is attached to the first package 130, has a low-power wireless-communications interface (e.g., Bluetooth LE), and is optionally marked with a white-colorant. The secondary agent 136 intermediate-node (as discussed in table 129) is attached to the second package 134, has a low-power wireless-communications interface (e.g., Bluetooth LE) and a medium-power communications-interface (e.g., LoRa), and is optionally marked with a green-colorant. The tertiary agent 140 parent node (as discussed in table 129) is attached to a third package 138, has three low-power communications interfaces (e.g., Bluetooth LE, NFC, and RFID), a medium power communications interface (e.g., LoRa), and a high-power communications interface (e.g., cellular), and is optionally marked with a black colorant. The communications interfaces of the secondary agent 136 and the tertiary agent 140 are backward compatible with the communications interface (e.g., Bluetooth LE) of the master agent 132.

In addition to packaging applications, the master, secondary, and tertiary agents 132, 136, and 140 may be deployed on or within physical premises, such as buildings, warehouses, and other infrastructure (e.g., as described with reference to the physical premises 236 in FIG. 9). For example, in some embodiments, the secondary and tertiary agents 136, 140 may be deployed on physical premises infrastructure (e.g., walls, doors, and conveyor systems), vehicles (e.g., fork lifts, trucks, and carts), and objects (e.g., boxes, packages, documents, coffee mugs).

In prior art network-connectivity, nodes are arranged hierarchically with higher-power parent nodes designated as master nodes that are conceptually located at higher levels in a typical node-hierarchy and have unilateral control over the low-power child nodes, which are conceptually located at the bottom level of the hierarchy. In the prior art network-connectivity, the master nodes (e.g., the secondary and tertiary agents of the present disclosure) are configured to periodically scan for transmissions from the child nodes (e.g., the master agent of the present disclosure). As a result, a high demand is placed on the resources of the master nodes (e.g., the secondary and tertiary agents of the present disclosure). This demand is particularly high when there are numerous child nodes (e.g., the master agent of the present disclosure), which tends to rapidly decrease the battery levels of the master nodes (e.g., the secondary and tertiary agents of the present disclosure) and increase network congestion between the high-power master nodes and the numerous child nodes.

In contrast to the prior art network-connectivity, for the network-connectivity of network 600, the roles of the parent-child relationship in the prior art network-connectivity have switched: the low-power child-node is the master node (e.g., master agent 132), which has unilateral control over the parent nodes (e.g., the secondary agent 136 and the tertiary agent 140). As a result, many of the tasks previously performed by the secondary and tertiary agents are unnecessary. For example, in the networks of FIG. 6, 9, or 10, there is no need for the higher-level parent-nodes to scan for transmissions from the child nodes; instead, the master agent 132 (child node) drives the communications flow from the master agent 132 to the secondary agents and the tertiary agents 136, 140. The master agent 132 transmits service requests to the secondary agent 136 or the tertiary agent 140, or both. In this way, there is no need for the secondary agent 136 and the tertiary agent 140 to continuously scan for packet transmissions from the child nodes; the master agent 132 may initiate a scan to transmit packets to the secondary and tertiary agents 136, 140. In addition, the child nodes operate autonomously, and thereby substantially avoid network congestion by sending requests for service to the secondary and tertiary agents 136, 140 only when needed.

In some embodiments, one or more of the master agent 132, the secondary agent 136, and the tertiary agent 140 receive data that includes descriptions of the resources that are available from the master agents 132 over the network 600. Examples of such resources are sensors, such as a temperature sensor, a moisture sensor, and an acceleration sensor; communication interfaces, such as Bluetooth communications interfaces, LoRa communications interfaces, and cellular communications interfaces; power sources, such as mains power and battery power; and memory resources. In one operational example, when the master agent (child node) detects that it has insufficient resources to complete a task, the master agent (child node) broadcasts, to other agents within wireless range, a request asking whether the insufficiency (e.g., a sensor required to collect data of a certain type, such as a vibration sensor to collect vibration data, and accelerometer to detect movement, etc.) may be remedied by at least one of the other agents sharing one or more resources (e.g., sensors, such as a vibration sensor or an accelerometer). In this example, the master agent (child node) broadcasts, using low power communication interface 52, a message requesting the type of resource required and a deadline for completing the task. If at least one other agent in the environment of the master agent that receives the message is able to satisfy the request, the other agent sends a reply message to the master agent (child node). Where multiple agents respond, the master agent (child node) may select one of the multiple agents to provide the resource based on one or more criteria (e.g., the first agent to reply to the request). Accordingly, the master agent (child node) may receive a confirmation message from the other agent indicating that the requested task either was completed or was not completed. Depending on the type of task to be performed by the selected agent, the master agent (child node) may or may not receive a data payload in the confirmation message.

Transient Wireless Communications Network

In a transient wireless communications network, agents of the network may be in motion relative to other transient wireless communications networks. When one of the agents in the transient wireless communications network is a first party to a communication and has unlimited power (e.g., it is connected to electrical mains power supply, a vehicle power source, etc.), the other party to the communication may conserve battery power because a receiver of the first party may be on all the time and thereby may immediately receive the communication from the other party.

When unlimited power is not available, the agents of the transient wireless-communications network (e.g., the network 600, FIG. 6) may be battery powered. To conserve power, communications within the transient wireless-communications network (e.g., the network 600) are a priori scheduled across all agents into a hierarchy of time slots. In some embodiments, the time slots are assigned a priori based on geographical or functional criteria. Accordingly, communications occur in discrete time slots that are scheduled between a sender and a receiver, where the sender transmits data (e.g., a predetermined schedule of shipping data of the scheduled time and place where the one or more packages or assets that the agents are attached should be located at a specific time) during a scheduled time slot and the receiver receives the transmitted data during the scheduled time slot. In this process, the sender and receiver both wake up (e.g., from a power-saving mode) during the scheduled time slot and may exchange security and other credentials in accordance with a communication protocol. For example, the transmitting agent sends data or other communication (e.g., shipping data, such as a predetermined schedule of shipping data) in the time slot and the receiving agent listens during the time slot. When there is a communication collision (e.g., both agents transmit data at the same time), the agents allocate another time slot at a certain time in the future. In one synchronization method, for example, one of the agents may specifically assign the other agent to a certain time slot in the future (e.g., 5 seconds in the future). The objective of this approach is for both agents to remain in the off state (e.g., in a low-power mode with transceivers powered down) as long as possible to conserve battery power. The time slots are assigned a priori based on geographical or functional criteria; but once an agent wakes up to communicate with another agent there still might be a collision, then an agent allocates a new specific time slot for the communication. For example, the allocation may occur by each agent allocating a time slot for 5 seconds in the future for a first set of agents to transmit data and for a second set of agents to receive data.

An agent's battery life also may be improved by providing an accurate global clock. In some embodiments, at least one agent includes an embedded solid-state atomic clock that provides a highly-accurate current time. The at least one tape agent with a solid-state atomic clock may send a current time to other tape agents when communicating with the other tape agents. The more accurately time is tracked by each tape agent, the shorter the time period needed for the communication between tape agents. Thus, the more accurate the clock, the less battery consumption is needed to communicate in the transient network (e.g., the network 600). In certain scenarios, multiple tape agents in the network (e.g., the network 600) each have an atomic clock, and a designated agent is configured to combine (e.g., average) received times and generates a current time for the transient network (e.g., a synchronization of network time).

In some embodiments, agent battery consumption is further reduced by reducing time drift in the transient network (e.g., the network 600). Examples of drift reduction methods include using a high accuracy clock (e.g., a solid-state atomic clock), performing temperature-based compensation of the clock, pressure-based compensation of the clock, and measuring and compensating for time drift. Inter-agent communication is an opportunity to synchronize the clocks of the agent, where the decision to synchronize is based on the amount of battery life remaining in the agent and the degree of time drift. If the degree of time drift is above a threshold, the drift may be reduced by one or more of using an accurate clock, using a time derived from an average of multiple clocks, temperature compensation, and time synchronization.

An agent may have different roles, such as a time-keeping role and a positioning role. In an embodiment, a tape node may operate as a transient-networking support-agent and includes a solid-state atomic clock, a GPS receiver, and a data-storage buffer. The solid-state atomic clock keeps an accurate time, the GPS receiver reports the current location of the time-keeping agent, and the buffer stores the times and locations of the transient-networking support-agent. In operation, the transient networking support agent transmits the current time to every agent that comes within range of the support agent, reports the current location in GPS coordinates, and stores the time and location data in the buffer.

Figure 9:
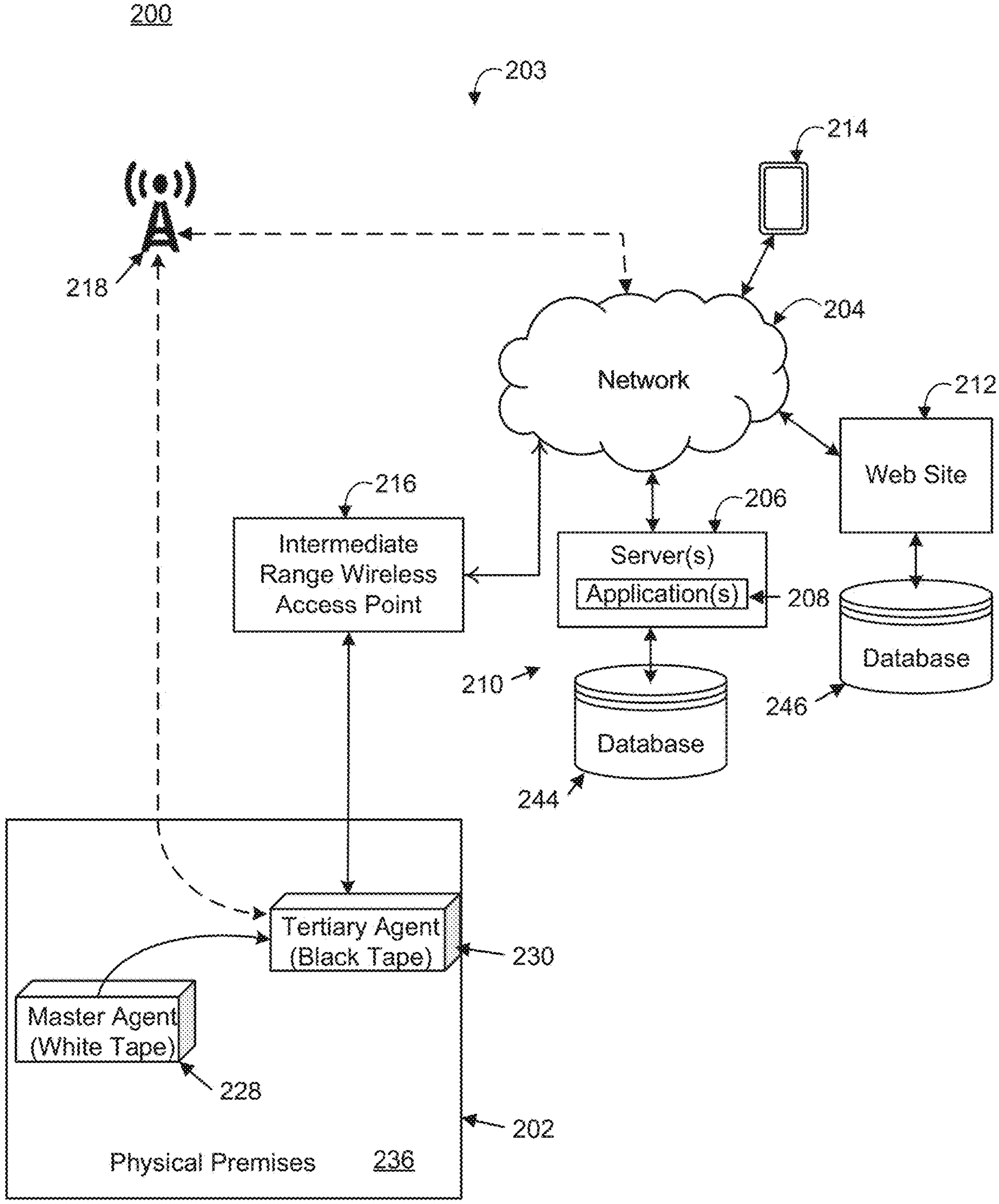
FIG. 9 is a diagrammatic view of example network infrastructure in a physical premises communicating with a network service, according to an embodiment.

The buffer role is enabled by an agent affixed to a monitored asset (e.g., a parcel) within a physical premises 236 (FIG. 9). In one example, the agent (e.g., master agent 132, FIG. 6) on the monitored asset (e.g., the first package 130, FIG. 6) goes through a manufacturing plant passing by networking support agents (e.g., the secondary or tertiary agents 136, 140, FIG. 6) attached to, e.g., walls and/or other infrastructure, where the networking support agents demarcate different milestones within the manufacturing plant. The networking support agents attached to the infrastructure may not be plugged into an outlet or power source, and thus have a battery with a limited power supply. In an example scenario, as an asset carrying an agent moves past the transient-networking support-agents, the respective agent on the asset may measure its own battery level and then send that measured battery level to the transient-networking support-agents or the transient-networking support-agents may measure its own battery level and send that measured battery level to the respective agent. A black infrastructure agent (e.g., a tertiary agent 140, with reference to FIG. 6) communicates the voltage readings to the cloud (e.g., a network service 204, 402, with reference to FIGS. 9, 10). As explained above, however, the network service cloud is not the master, a master agent (child node) is the master. The higher-level agents (e.g., black and green agents) are configured to provide services to the master agents (e.g., white agents), which have the shortest battery lives.

Figure 7:
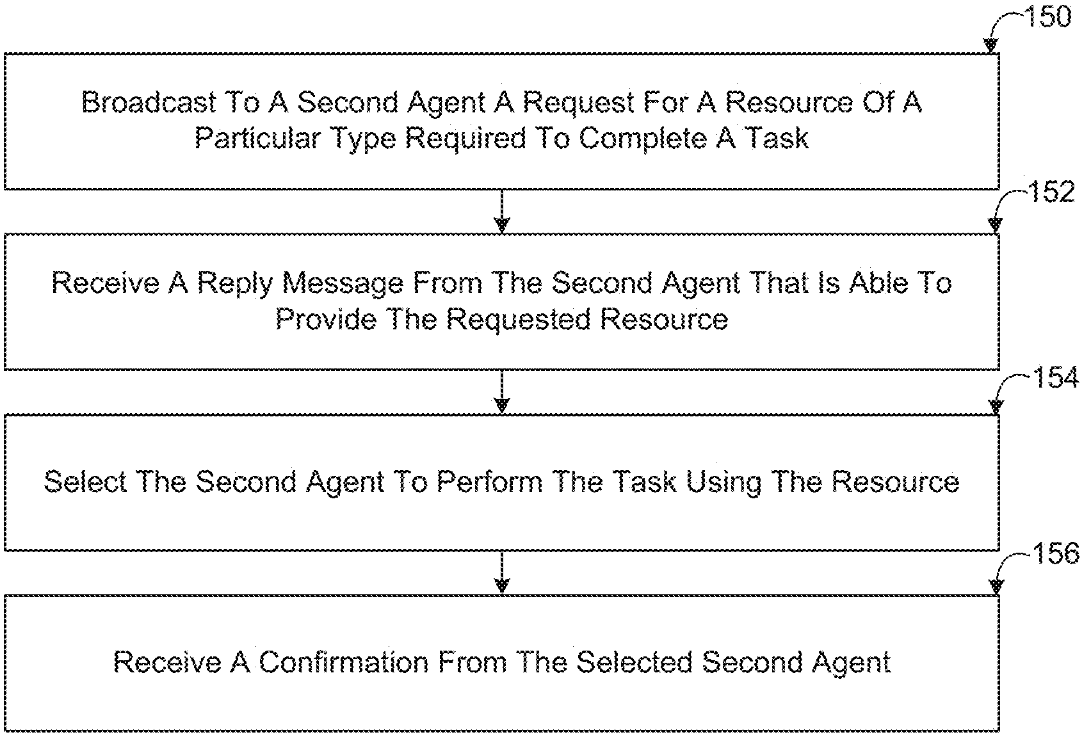
FIG. 7 is a flow diagram of a method of sharing resources between different agents to offload responsibilities to complete a task, according to an embodiment.

FIG. 7 is a flow diagram showing one example resource sharing process among network agents (e.g., master agent 132, secondary agent 136, and/or tertiary agent 140, FIG. 6). A first agent (e.g., the master agent 132) broadcasts to a second agent (e.g., another master agent, secondary agent 136, and/or a tertiary agent 140) a request for a resource of a particular type (e.g., vibration data collected from a vibration sensor) that is required to complete a task (e.g., determine whether a package, such as any of the packages 130, 134, 138, FIG. 6, have been tampered with) to be performed by the agent (block 150). The first agent receives a reply message from the second agent that is able to provide the requested resource (block 152). The first agent selects the second agent to perform the task using the resource (block 154). The first agent receives an optional confirmation from the selected second agent (block 156). The confirmation may include an indication that the task was completed or was not completed.

Thus, instead of having the cloud orchestrate the network (e.g., the network 600) of various agents (e.g., master agent 132, secondary agent 136, and/or tertiary agent 140)—which requires the network service cloud to be programmed to handle a large number of complex situations—the architecture is simplified significantly by making the agents intelligent.

In an example transient network (e.g., the network 600), assets are in motion. A container on a truck carrying one or more agents (e.g., a master agent 132 and a secondary agent 136) may park next to a pump carrying an agent (e.g., a master agent 132 and a secondary agent 136) and the two agents initiate a handshake protocol. A first agent on the container communicates with second agent on the pump. After discovering all agents on the pump, the agents on the container read out all the measurement data (e.g., vibration data) associated with the pump. The agent on the container offers services to the agents associated with the pump. For example, a black agent on the container offers the service of communicating the data to the cloud service over a cellular connection when, e.g., the agent on the container has a low-power wireless-communication interface (e.g., the low-power wireless-communication interface 52, with reference to FIG. 3A), that may not be able to communicate at a range that reaches the cloud service.

In another scenario, a first agent (e.g., master agent 132) is attached to a pump and is programmed to communicate a message once per day if there is any vibration issue with the pump by utilizing a vibration sensor collecting vibration data. When a second agent (e.g., a secondary agent 136) on a vehicle comes within communication range of the first agent, the first agent communicates with the second agent to request that the second agent communicates the message on behalf of the first agent. The second agent replies that it is not capable of communicating to the cloud, but it is able to store an instruction and communicate the message to the cloud by delegating the instruction to a third agent (e.g., tertiary agent 140) with cloud communication ability (e.g., the high-power wireless-communication interface 82", with reference to FIG. 3C) when the second agent is within range of the third agent. The first agent agrees with the arrangement and, after becoming within range of the third agent, the second agent delegates the instruction to the third agent, which communicates the instruction to the cloud.

As explained above, the master agents control the secondary and tertiary agents, not the network service. The secondary agents and the tertiary agents offer services to the master agents, which may have low-battery capacity (e.g., due to being attached to packages and not connected to a power source, such as an outlet) and be programmed with instructions for performing a wide variety of tasks. If the time drift between the clocks of a first agent and a second agent is too large, the first agent and the second agent will not be able to communicate without using a significant amount of battery life on each of the agents trying to communicate. To remedy this, an agent may have a master clock to increase accuracy, that is used to synchronize the other agent clocks. In particular, the master clock reports the current time to each of the agents within range of the master clock. In some embodiments, the master clock is a solid-state atomic clock. In other embodiments, more than one agent has a master clock and the current time is derived from the multiple agents' master clocks. For example, in an embodiment, the current time is the average of the current times reported by the multiple master clocks.

Two agents may fall out of lockstep when their respective clocks drift relative to each other, such that scheduled time slots for the agents to communicate are not synchronized. An agent may determine that it is out of lockstep when it does not receive an acknowledgement of a transmitted message. The agents may implement one or more methods for re-synchronizing their clocks, including turning on the transmitter of one agent and turning on the receiver of another agent until communication is established and lockstep is achieved. For example, the transmitter of a first agent and the receiver of a second agent are turned on for a predetermined (e.g., 5, 10, 15 seconds or minutes) time range until communication occurs. If a first attempt does not achieve lockstep, there may be five following attempts to achieve lockstep. Alternatively, a third agent that includes time-keeping functionality (e.g., by having a master clock or wireless access, such as via the internet, to a remote clock that has a universal time) may be used. Additionally, an agent may reset its own time (e.g., by having a master clock) and then return into lock step. At some point, when an agent cannot achieve lockstep, the agents may turn on a communications channel, that every agent can access, for 10 seconds, every ten seconds or every hour so, so that the agents may join the communications channel during that time in the chance for the agents to transmit or receive within the time interval.

In certain embodiments, when attempting resynchronization, the agent determines whether it is to transmit or receive based upon an identifier (e.g., MAC address, or hash of the MAC address, or a hash derived from included hardware components) stored in the agent's memory. For example, the agent may determine that it is to transmit when a least significant bit of the identifier is a one, and determine that it is to receive when the least significant bit of the identifier is a zero. The agent may use more than one least significant bit of the identifier to determine whether to transmit or receive when not synchronized. The agent may determine a time of transmission, a delay in transmission, and an interval in transmission, for every agent, based on the identifier. Alternatively, when not in lockstep, each of the agents may use a pseudo random number generator to determine whether to transmit or receive. When using a single bit to determine whether to transmit or receive, there is a 25% chance of both agents receiving, a 25% chance of both agents transmitting, and a 50% chance of one agent transmitting and the other agent receiving.

In some embodiments, the agents may have their sensor (e.g., vibration sensor, accelerometer, gyroscope, etc.) configuration programmed into their firmware when the firmware is updated at initialization of the agent, and the scheduling may be based on the sensor configuration. For example, if the scheduling of a time slot is for a specific type of task (e.g., gathering vibration data), the time slot may be open for the agents that have vibration sensors. Each agent may reference their sensor configuration to determine whether the agent has a vibration sensor, and then a time slot schedule may be determined based on the agents with the vibration sensors.

In some embodiments, when not in lockstep, the agent determines whether to transmit or receive based on remaining battery life of the agent. For example, when battery voltage is below a predefined threshold, the agent will receive and, when above the predefined threshold, the agent will transmit. Similarly, the duration of transmitting and/or receiving may be determined based upon the battery voltage. Each agent may record its own battery life and then transmit that battery life amount to a designated agent (e.g., the master agent 132, with reference to FIG. 6) or to a mobile or stationary gateway (e.g., the mobile gateway 412 and the stationary gateway 414, with reference to FIG. 10). For example, if the scheduling of a time slot is for a specific type of task (e.g., gathering vibration data), the time slot may be open for the agents that have vibration sensors. Each agent may reference their sensor configuration to determine whether the agent has a vibration sensor, and then a time slot schedule may be determined based on the agents with the vibration sensors.

In some embodiments, the agent may estimate remaining battery life based on its sensor configuration and its operational duration. The scheduling for each agent to transmit or receive data may be based on this determined remaining battery life. The agent may also determine a priority for resynchronization based upon its status and/or situation, whereby the priority defines the effort that the agent makes to resynchronize. For example, when the agent has detected, based on its accelerometer, that an asset the agent is attached to has fallen, the priority for resynchronization is high (e.g., to be able to report the fall of the asset) as compared to a low priority for resynchronization when the agent has not detected any change in its environment.

Figure 8:
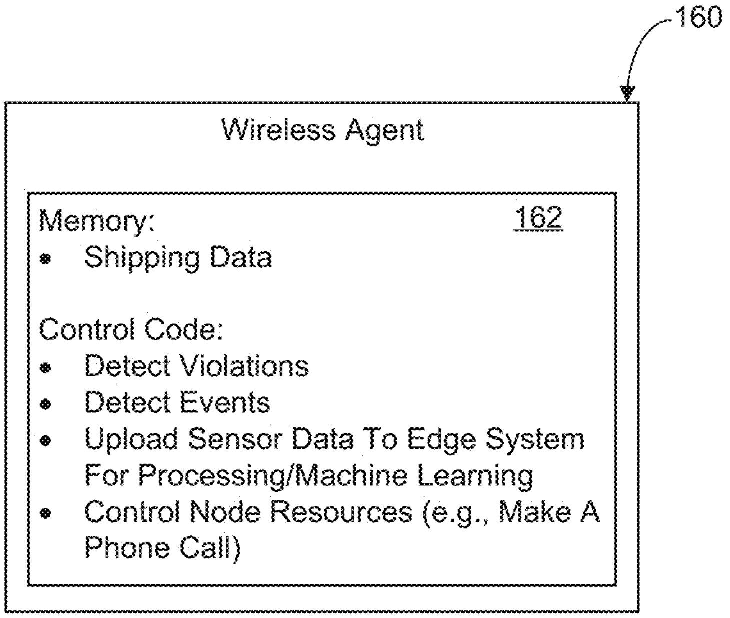
FIG. 8 is a diagrammatic view of a memory of an agent, according to an embodiment.

FIG. 8 shows one example of a wireless agent 160 with a memory 162 storing shipping data (e.g., a predetermined scheduled of shipping data that includes logistics for at least one asset) and control code for performing various tasks. The shipping data (e.g., a predetermined schedule of shipping data) may include a schedule of where an asset that the agent is attached to should be located at specific times. In some embodiments, the shipping data (e.g., the predetermined schedule of shipping data) may further include a schedule for the wireless agent 160 communicating the shipping data. For example, the schedule for communicating the shipping data may include a list or table of all times when the wireless agent 160, and one or more agents of a network of wireless agents, are available, or instructed, to communicate with one another. For example, the table or list may include that at 5:00 PM PT, on a certain day, wireless agent 160 may, or is instructed to, communicate with another wireless node. Further, the table or list may include which of the wireless agent 160 and the other wireless agent will transmit and which will receive. The table or list may further include protocol for when or if there is a data collision between any two or more agents attempting to communicate. One or more agents within the network may include this table or list.

The control code causes the wireless agent 160 to perform various tasks, including detecting industrial IoT violations (such as IoT device hacking or theft), detecting events, uploading sensor data to an edge system for generating data (e.g., statistics, analytics, etc.) for machine learning, and controlling agent resources (e.g., a master agent (child node) unilaterally controlling a cellular communications interface of a tertiary agent to make a phone call).

In some embodiments, the control code includes instructions that causes the wireless agent 160 to perform tasks (e.g., asset tracking). In some embodiments, the control code may be instructions that include high-level languages, low-level languages (e.g., machine language, assembly, etc.), and/or firmware. In some examples, the instructions are determined by mapping out shipping data, for example, a description of a supply-chain including parcels (e.g., boxes, pallets, and containers) and feeding that information into an industrial IoT coordination processing system (e.g., logistical software that coordinates, utilizing IoT devices such as the agents, efficient routes for the assets to reach a destination). The industrial IoT coordination processing system compiles supply chain data (e.g., shipping data) to derive respective computer-readable instructions for each of the wireless communication devices in the overall system (e.g., agents, such as tape agents 132, 136, and 140 and line-powered wireless communications devices, collectively referred to herein as "wireless communications agents"). In certain embodiments, any agent may detect an industrial IoT coordination rule violation by performing localized context-sensitive checks between periods in which at least one agent is in sleep mode. For example, the agents download checks and rule violations that trigger alarms, including supply chain rules regarding dropped packages, temperature violations, incorrect parcel splits and consolidations. The agents log all events (e.g., parcel splits and consolidations) and store them as shipping data.

In one example of operation, a set of parcels are defined as a group using an encoding system that instructs the network (e.g., the network 600) of agents associated with the parcels (e.g., attached thereto) to identify which agent are members of the group, to increase tracking efficiency of the set of parcels. In some embodiments, the agents in the group are programmed to wake up at scheduled times (e.g., to perform the control code) to ensure that the current grouping of agents is still consistent with the shipping data (e.g., a set of logistical instructions that reference the shipping data installed in memory and capable of execution by the processors of the agents). For example, at a scheduled wakeup time, the agents determine if there are any group members that have improperly split off from the designated group (e.g., if a package dropped from a container or if there was a stolen package) and if there are any additional agent-members that improperly joined the designated group without receiving instructions from the industrial IoT processing system that there was a change in agent membership associated with a particular group. In some examples, if there is an unaccounted change in the agent-membership of a defined group (e.g., more agents within the group than is listed in industrial IoT coordination instructions), at least one (e.g., designated) of the agents will trigger an alarm. For example, as a vehicle is being loaded with a group of parcels, one or more of the agents are configured to detect when a parcel in the group has not been loaded on the vehicle and detect when a parcel that is not part of the group has been loaded on the vehicle.

In another example, the industrial IoT processing system encodes instructions for detecting and responding to potentially damaged items in parcels. For example, if an agent detects acceleration of the parcel above a threshold acceleration level, indicating that the parcel may have been dropped, the agent will signal the industrial IoT coordination system to abort the shipment of the parcel or for an authorized personnel to check on the parcel for damage.

FIG. 9 shows an example of a network communications environment 200 that includes an architectural platform 202 on which a wide variety of different wireless tag-based applications may be implemented, including, for example, industrial Internet-of-Things applications. In the illustrated embodiments, the architectural platform 202 includes a distributed network service infrastructure 203 and a physical premises infrastructure 236.

The distributed network service infrastructure 203 includes a network 204 (e.g., the internet) that supports communications with one or more servers 206 executing one or more applications 208 of a network service 210, a web site 212 associated with the network service 210, a computing device 214 (e.g., a mobile phone, a tablet or laptop computer, or the like), and optionally one or more access points including an intermediate range wireless access point 216 (e.g., a LoRaWAN) and a cellular access point 218. In some examples, the distributed network service infrastructure 203 further includes one or more network communication systems and technologies, including any one or more of wide area networks, local area networks, public networks (e.g., the internet), private networks (e.g., intranets and extranets), wired networks, and wireless networks. The distributed network service infrastructure 203 also may include communications infrastructure equipment, such as a geolocation satellite system (e.g., GPS, GLONASS, and NAVSTAR), cellular access point 218 (e.g., GSM/GPRS or a cellular communication systems), Wi-Fi communication systems, and intermediate range wireless access point 216 (e.g., LoRaWAN and/or a RF communication system).

In the illustrated example, the network service 210 includes an application 208 (e.g., a user application) that executes on a computing device 214 (e.g., a client device) to enable an employee of the network service 210 to configure and retrieve status and sensor data from components (e.g., wireless network devices, also referred to as "network agents") of the network infrastructure 203 on the physical premises 236. The disclosed embodiments utilize different types of network agents to collect data from within the physical premises 236, including master agents, intermediate agents, and peripheral agents. Examples of the types of data that may be collected by the network agents include parcel status information, event data, and sensor data (e.g., temperature data, acceleration data, location data, etc.). The network service 210 stores in an end-user database 244 user account information and data obtained from the master agent 228 and the tertiary agent 230. In the illustrated example, users of the network service 210 may utilize a web browser application to access the web site 212, which provides access to a database 246 that stores end-user data for each user of the web site 212. In the example shown in FIG. 9, users may access the web site 212 to obtain information regarding, for example, the shipping status and/or condition of their parcels, as well as other information concerning the users' parcels and other items.

In general, the network infrastructure may be implemented by a wide variety of wireless network nodes. In some embodiments, the network infrastructure includes various types of agents within the physical premises 236, including a master agent 220, one or more secondary agents, and tertiary agents 230. In some examples, multiple classes or types of agents are used to implement a particular application, where each agent class has a different respective set of roles, functionalities and/or capabilities. In some examples, the master agent and secondary agents communicate in the physical premises over local channels implemented using low-power wireless communications interfaces, such as a Bluetooth communication interface (e.g., a Bluetooth Low Energy system), a Z-wave communication interface, and a ZigBee communication interface, as described above.

Communication across the network communications environment 200 is secured by a variety of different security mechanisms. In the case of existing infrastructure, a communication link uses existing infrastructure security mechanisms. In the case of communications among tape agents, communication is secured through a custom security mechanism. In certain cases, agents may also be configured to support block chain-based security measures that protect the transmitted and stored data.

The physical premises 236 may be, for example, any location in which there are persons, places, or things to be monitored, tracked, sensed, or inventoried, including any building or structure, such as a warehouse, a distribution center, a manufacturing establishment, a supplier establishment, a customer establishment, a retail establishment, a restaurant, an apartment building, a hotel, a house, or other dwelling or defined space.

Figure 10:
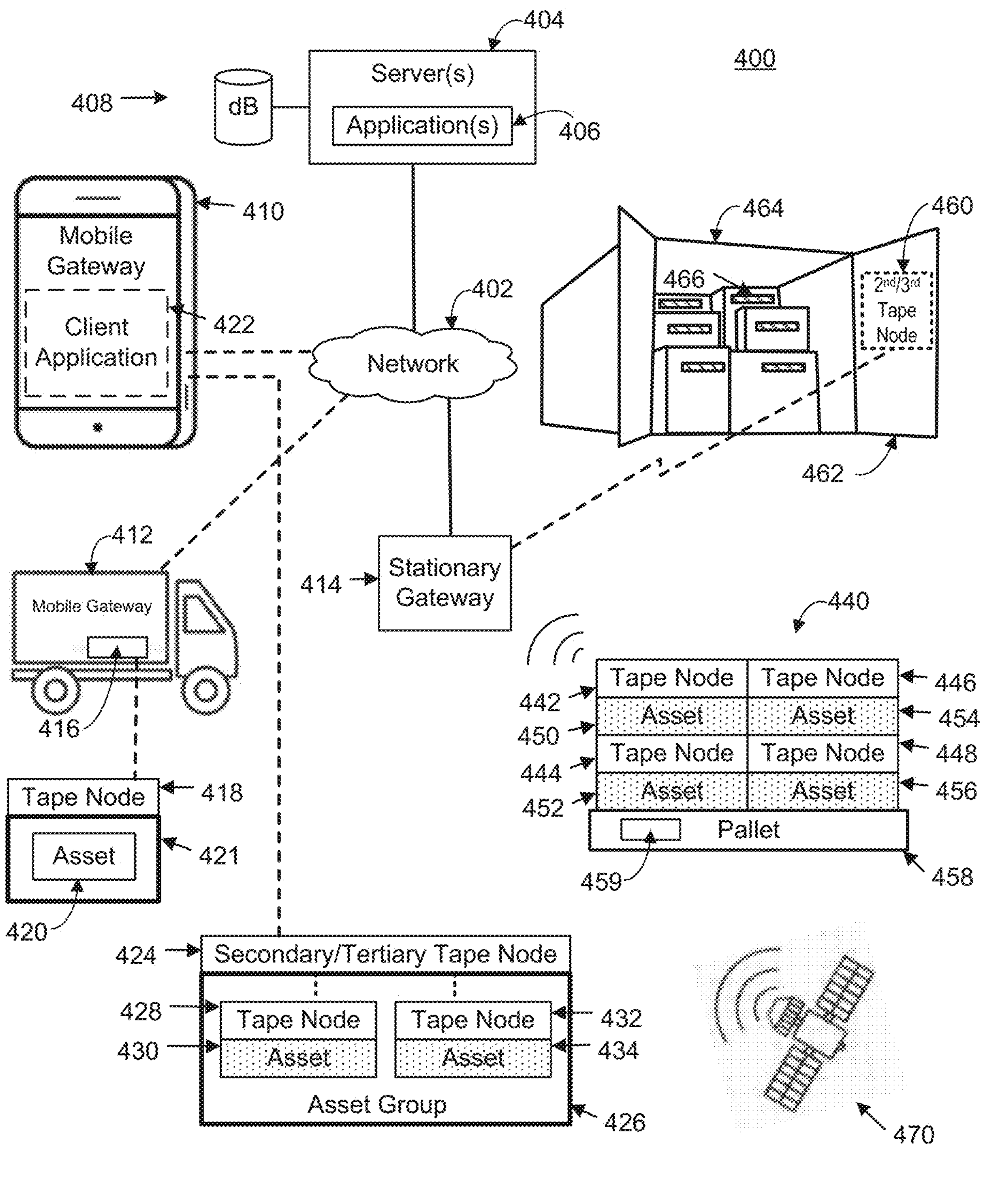
FIG. 10 is a diagrammatic view of an example of a network environment supporting communications with various agents, according to an embodiment.

FIG. 10 shows an example network communications environment 400 that includes a network 402 that supports communications between one or more servers 404 executing one or more applications of a network service 408, mobile gateways 410 (a smart device mobile gateway), 412 (a vehicle mobile gateway), a stationary gateway 414, and various types of tape nodes that are associated with various assets (e.g., parcels, equipment, tools, persons, and other things). Hereinafter "tape nodes" may be used interchangeably with the "agents", as described above, with reference to FIGS. 1-9; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 402 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 470 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 420) or other stationary (e.g., stationary gateway 414) or mobile object (e.g., a, such as a delivery truck, such as mobile gateway 412) or stationary object (e.g., a structural element of a building). This process activates the tape node (e.g., the tape node 418) and causes the tape node 418 to communicate with the one or more servers 404 of the network service 408. In this process, the tape node 418 may communicate through one or more other tape nodes (e.g., the tape nodes 442, 444, 446, 448) in the communication hierarchy. In this process, the one or more servers 404 executes the network service application 406 to programmatically configure tape nodes 418, 424, 428, 432, 442, 444, 446, 448, that are deployed in the network communications environment 400. In some examples, there are multiple classes or types of tape nodes (e.g., the master agent 132, secondary agent 136, or tertiary agent 140), where each tape node class has a different respective set of functionalities and/or capacities, as described above with respect to the "agents" in FIGS. 1-9. For example, the master agents 132 (with reference to FIGS. 3A and 6) have a lower-power wireless communication interface (e.g., the low-power wireless-communication interface 52, with reference to FIG.

3A), in comparison to the secondary and tertiary agents 136, 140 (with reference to FIGS. 3A-C and 6).

In some examples, the one or more servers 404 communicate over the network 402 with one or more gateways 410, 412, 414 that are configured to send, transmit, forward, or relay messages to the network 402 in response to transmissions from the tape nodes 418, 424, 428, 432, 442, 444, 446, 448 that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated network of tape nodes, including tape node 418 (e.g., a master tape node) in the form of a label that is adhered to a parcel 421 (e.g., an envelope) that contains an asset 420, and is further configured to communicate with the network service 408 over the network 402. In some examples, the tape node 418 includes a lower-power wireless-communications interface of the type used in, e.g., segment 40 (shown in FIG. 3A), and the wireless communications unit 416 may implemented by a secondary or tertiary tape node (e.g., one of segment 70 or segment 80, respectively shown in FIGS. 3B and 3C) that includes a lower-power communications interfaces for communicating with tape nodes within range of the mobile gateway 412 and a higher-power communications-interface for communicating with the network 402. In this way, the tape node 418 and wireless communications unit 416 create a hierarchical wireless network of tape nodes for transmitting, forwarding, bridging, relaying, or otherwise communicating wireless messages to, between, or on behalf of the tape node 418 in a power-efficient and cost-effective way.

In some examples, a mobile gateway 410 is a mobile phone that is operated by a human operator and executes a client application 422 that is configured by a network service to communicate with a designated set of tape nodes, including a secondary or tertiary tape node 424 that is adhered to a parcel 426 (e.g., a box), and is further configured to communicate with a server 404 over the network 402. In the illustrated example, the parcel 426 contains a first parcel labeled or sealed by a master tape node 428 and containing a first asset 430, and a second parcel labeled or sealed by a master tape node 432 and containing a second asset 434. The secondary or tertiary tape node 424 communicates with each of the master tape nodes 428, 432 and also communicates with the mobile gateway 410. In some examples, each of the master tape nodes 428, 432 includes a lower-power wireless-communications interface of the type used in, e.g., segment 40 (shown in FIG. 3A), and the secondary/tertiary tape node 424 is implemented by a tape node (e.g., segment 70 or segment 80, shown in FIGS. 3B and 3C) that includes a low-power communications interface for communicating with the master tape nodes 428, 432 contained within the parcel 426, and a higher-power communications interface for communicating with the mobile gateway 410. The secondary or tertiary tape node 424 is operable to relay wireless communications between the master tape nodes 428, 432 contained within the parcel 426 and the mobile gateway 410, and the mobile gateway 410 is operable to relay wireless communications between the secondary or tertiary tape node 424 and the server 404 over the network 402. In this way, the master tape nodes 428 and 432 and the secondary or tertiary tape node 424 create a wireless network of nodes for transmitting, forwarding, relaying, or otherwise communicating wireless messages to, between, or on behalf of the master tape nodes 428, 432, the secondary or tertiary tape node 424, and the network service (not shown) in a power-efficient and cost-effective way.

In some examples, the stationary gateway 414 is implemented by a server 404 executing a network service application 406 that is configured by the network service 408 to communicate with a designated set 440 of master tape nodes 442, 444, 446, 448 that are adhered to respective parcels containing respective assets 450, 452, 454, 456 on a pallet 458. In other examples, the stationary gateway 414 is implemented by a secondary or tertiary tape node 460 (e.g., segments 70 or 80, respectively shown in FIGS. 3B and 3C) that is adhered to, for example, a wall, column or other infrastructure component of the physical premise's environment 400, and includes a low-power communications interface for communicating with nodes within range of the stationary gateway 414 and a higher-power communications interface for communicating with the network 402.

In one embodiment, each of the master tape nodes 442-448 is a master tape node and is configured by the network service 408 to communicate individually with the stationary gateway 414, which relays communications from the master tape nodes 442-448 to the network service 408 through the stationary gateway 414 and over the network 402. In another embodiment, one of the master tape nodes 442-448 at a time is configured to transmit, forward, relay, or otherwise communicate wireless messages to, between, or on behalf of the other master nodes on the pallet 458. In this embodiment, the master tape node may be determined by the master tape nodes 442-448 or designated by the network service 408. In some examples, the master tape nodes 442-448 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 459 is adhered to the pallet 458 and is configured to perform the role of a master node for the other master tape nodes 442-448. In these ways, the master tape nodes 442-448, 459 are configurable to create different wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated network of tape nodes, including the secondary or tertiary tape node 460 that is adhered to the inside of a door 462 of a shipping container 464, and is further configured to communicate with the network service 408 over the network 402. In the illustrated example, the shipping container 464 contains a number of parcels labeled or sealed by respective master tape nodes 466 and containing respective assets. The secondary or tertiary tape node 460 communicates with each of the master tape nodes 466 within the shipping container 464 and communicates with the stationary gateway 414. In some examples, each of the master tape nodes 466 includes a low-power wireless communications-interface (e.g., the low-power wireless-communication interface 52, with reference to FIG. 3A), and the secondary or tertiary tape node 460 includes a low-power wireless-communications interface (low-power wireless-communication interfaces 52', 52", with reference to FIGS. 3B—C) for communicating with the master tape nodes 466 contained within the shipping container 464, and a higher-power wireless-communications interface (e.g., medium-power wireless-communication interface 72', medium-power wireless-communication interface 72", high-power wireless-communication interface 82", with reference to FIGS. 3B-C) for communicating with the stationary gateway 414. In some examples, either a secondary or tertiary tape node, or both, may be used, depending on whether a high-power wireless-communication interface is necessary for sufficient communication.

In some examples, when the doors of the shipping container 464 are closed, the secondary or tertiary tape node 460 is operable to communicate wirelessly with the master tape nodes 466 contained within the shipping container 464. In some embodiments, both a secondary and a tertiary node are attached to the shipping container 464. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 460 is configured to collect sensor data from master tape nodes 466 and, in some embodiments, process the collected data to generate, for example, statistics from the collected data. When the doors of the shipping container 464 are open, the secondary or tertiary tape node 460 is programmed to detect the door opening (e.g., using a photodetector or an accelerometer component of the secondary or tertiary tape node 460) and, in addition to reporting the door opening event to the network service 408, the secondary or tertiary tape node 460 is further programmed to transmit the collected data and/or the processed data in one or more wireless messages to the stationary gateway 414. The stationary gateway 414, in turn, is operable to transmit the wireless messages received from the secondary or tertiary tape node 460 to the network service 408 over the network 402. Alternatively, in some examples, the stationary gateway 414 also is operable to perform operations on the data received from the secondary or tertiary tape node 460 with the same type of data produced by the secondary or tertiary tape node 460 based on sensor data collected from the master tape nodes 442-448. In this way, the secondary or tertiary tape node 460 and master tape node 466 create a wireless network of nodes for transmitting, forwarding, relaying, or otherwise communicating wireless messages to, between, or on behalf of the master tape node 466, the secondary or tertiary tape nodes 460, and the network service 408 in a power-efficient and cost-effective way.

In an example of the embodiment shown in FIG. 10, there are three types of backward compatible tape nodes: a short-range master tape node (e.g., segment 40), a medium-range secondary tape node (e.g., segment 70), and a long-range tertiary tape node (e.g. segment 80), as respectively shown in FIGS. 3A-3C (here, "tape node" is used interchangeably with "agent", as described with reference to FIGS. 1-9). The short-range master tape nodes typically are adhered directly to parcels containing assets. In the illustrated example, the master tape nodes 418, 428, 432, 442-448, 466 are short-range tape nodes. The short-range tape nodes typically communicate with a low-power wireless-communication protocol (e.g., Bluetooth LE, Zigbee, or Z-wave). The segment 70 are typically adhered to objects (e.g., a parcel 426 and a shipping container 464) that are associated with multiple parcels that are separated from the medium-range tape nodes by a barrier or a long distance. In the illustrated example, the secondary and/or tertiary tape nodes 424 and 460 are medium-range tape nodes. The medium-range tape nodes typically communicate with low and medium-power wireless-communication protocols (e.g., Bluetooth, LoRa, or Wi-Fi). The segments 80 typically are adhered to mobile or stationary infrastructure of the network communications environment 400.

In the illustrated example, the mobile gateway 412 and the stationary gateway 414 are implemented by, e.g., segment 80. The segments 80 typically communicate with other nodes using a high-power wireless-communication protocol (e.g., a cellular data communication protocol). In some examples, the wireless communications unit 416 (a secondary or tertiary tape node) is adhered to a mobile gateway 412 (e.g., a truck). In these examples, the wireless communications unit 416 may be moved to different locations in the network communications environment 400 to assist in connecting other tape nodes to the wireless communications unit 416. In some examples, the stationary gateway 414 is a tape node that may be attached to a stationary structure (e.g., a wall) in the network communications environment 400 with a known geographic location (e.g., GPS coordinates). In these examples, other tape nodes in the environment may determine their geographic location by querying the stationary gateway 414.

In some examples, in order to conserve power, the tape nodes typically communicate according to a schedule promulgated by the network service 408. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 404, either directly or indirectly through a gateway tape node (e.g., the long-range tape node, such as wireless communication unit 416, adhered to the mobile gateway 412, or a long-range tape node, such as stationary gateway 414, that is adhered to an infrastructure component of the network communications environment 400). In other examples, the master tape node processes the information contained in the received data packets and transmits the processed information to the server 404.

Figure 11:
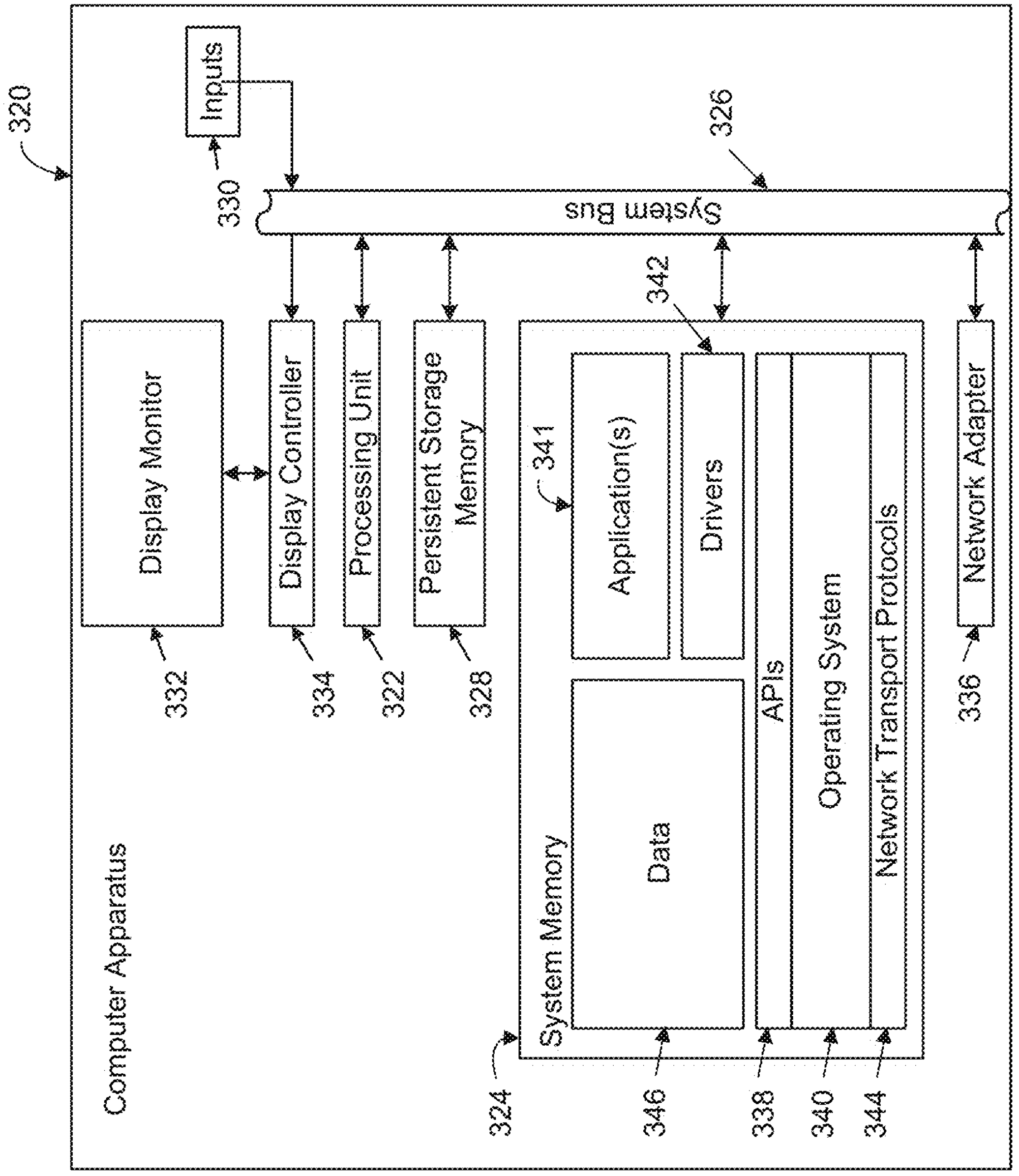
FIG. 11 is a block diagram of an example computer apparatus, according to an embodiment.

FIG. 11 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random-access memory (RAM). The system bus 326 may be a memory bus, a peripheral bus, or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the positioning and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, may be implemented in data processing apparatus (e.g., computer hardware and digital electronic circuitry) operable to perform functions by operating on input and generating output. Examples of the subject matter described herein also may be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular disclosures and should not be construed as limitations on the scope of any claimed disclosure. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method, comprising:

broadcasting, by a first intelligent node, a request for a resource of a particular type that is required to complete a task;

receiving, by the first intelligent node, from a plurality of second intelligent nodes, a plurality of replies, each reply comprising data indicating that a respective second intelligent node of the plurality can provide the requested resource of the particular type;

selecting, by the first intelligent node, a second intelligent node from the plurality of second intelligent nodes to perform the task using the resource of the particular type; and receiving, by the first intelligent node, from the selected second intelligent node, a confirmation to perform the task using the resource of the particular type.

2. The method of claim 1, wherein the first intelligent node includes low-range wireless-communication capabilities to within a proximity of the first intelligent node and the second intelligent node includes long-range wireless-communication capabilities sufficient to contact a remote server, and wherein the requested resource is the long-range wireless-communication capabilities, the method further comprising:

instructing, by the first intelligent node, the selected second intelligent node to transmit a message to the remote server.

3. The method of claim 2, wherein the selected second intelligent node includes a vibration sensor, wherein the requested resource is vibration sensing capabilities, the method further comprising:

instructing, by the first intelligent node, the selected second intelligent node to collect and then transmit collected vibration data to the first intelligent node.

4. The method of claim 1, wherein the broadcasting the request for a resource of a particular type that is required to complete a task and the receiving the plurality of replies are performed within a time slot, wherein the first intelligent node is determined to broadcast and the plurality of second intelligent nodes is determined to receive the broadcast based on the MAC address of both the first and second intelligent nodes.

5. The method of claim 1, wherein the broadcasting the request for a resource of a particular type that is required to complete a task and the receiving the plurality of replies are performed within a time slot, wherein the first intelligent node is determined to broadcast and the plurality of second intelligent nodes is determined to receive the broadcast based on the battery supply remaining on each intelligent node.

6. The method of claim 1, wherein the first intelligent node comprises a low-power wireless-communication interface, and wherein the selected second intelligent node comprises a medium-power wireless-communication interface having a longer range of communication than the low-power wireless-communication interface.

7. The method of claim 6, wherein the selected second intelligent node further comprises a high-power wireless-communication interface having a longer range of communication than the medium-power wireless-communication interface, the high-power wireless-communication interface configured to wirelessly communicate with a server associated with a network.

8. The method of claim 1, wherein the first intelligent node is a master agent configured to exercise unilateral control over the selected second intelligent node.

9. The method of claim 8, wherein the selected second intelligent node is a secondary agent or a tertiary agent configured to execute instructions received from the master agent.

10. The method of claim 1, wherein the selecting the second intelligent node from the plurality of second intelligent nodes comprises selecting a first intelligent node of the plurality to reply to the request.

11. The method of claim 1, wherein the broadcasting the request and the receiving the plurality of replies are performed during a time slot of a predetermined schedule defining communication between intelligent nodes within a transient wireless communications network.

12. The method of claim 11, further comprising the first intelligent node and the selected second intelligent node waking up from a power-saving mode during the time slot to exchange security credentials in accordance with a communication protocol.

13. The method of claim 11, wherein when there is a communication collision, the first intelligent node and the selected second intelligent node allocate another time slot at a certain time in the future.

14. The method of claim 1, wherein the first intelligent node includes a memory storing a predetermined schedule of shipping data for at least one asset, and wherein the first intelligent node identifies the plurality of second intelligent nodes based on referencing the predetermined schedule.

15. The method of claim 14, wherein the predetermined schedule of shipping data includes a schedule of where the at least one asset is to be located at specific times.

16. The method of claim 1, wherein at least one of the first intelligent node or the selected second intelligent node includes a solid-state atomic clock that provides a highly-accurate current time, the method further comprising synchronizing clocks of the first intelligent node and the selected second intelligent node based on the current time provided by the solid-state atomic clock.

17. The method of claim 16, further comprising reducing time drift between the first intelligent node and the selected second intelligent node by performing temperature-based compensation of the clock.

18. The method of claim 1, wherein the first intelligent node comprises a flexible adhesive tape platform configured to be adhesively attached to a surface of an asset.

19. The method of claim 18, wherein the flexible adhesive tape platform comprises an adhesive layer, a flexible substrate, a flexible circuit, and a flexible cover.

20. The method of claim 1, wherein the resource of the particular type comprises one or more of a sensor, a communication interface, a power source, or a memory resource.

* * * * *